(12) United States Patent
Mancini et al.

(10) Patent No.: US 6,898,938 B2
(45) Date of Patent: May 31, 2005

(54) DIFFERENTIAL PRESSURE INDUCED PURGING FUEL INJECTOR WITH ASYMMETRIC CYCLONE

(75) Inventors: Alfred Albert Mancini, Cincinnati, OH (US); Duane Douglas Thomsen, Loveland, OH (US); Michael Louis Vermeersch, Hamilton, OH (US)

(73) Assignee: General Electric Company, Schenectady, NY (US)

(*) Notice: Subject to any disclaimer, the term of this patent is extended or adjusted under 35 U.S.C. 154(b) by 93 days.

(21) Appl. No.: 10/422,265

(22) Filed: Apr. 24, 2003

(65) Prior Publication Data

US 2004/0250547 A1 Dec. 16, 2004

(51) Int. Cl.$^7$ .................................................. F23R 3/12
(52) U.S. Cl. ............................................ 60/748; 60/740
(58) Field of Search .................. 60/740, 748, 747, 60/746; 431/9, 8, 187, 182, 183, 284

(56) References Cited

U.S. PATENT DOCUMENTS

| | | | |
|---|---|---|---|
| 4,696,157 A | * | 9/1987 | Barbier et al. ............. 60/39.23 |
| 5,277,023 A | | 1/1994 | Bradley et al. |
| 5,288,021 A | * | 2/1994 | Sood et al. ............... 239/132.5 |
| 5,329,760 A | | 7/1994 | Bradley et al. |
| 5,331,805 A | | 7/1994 | Myers et al. |
| 5,417,054 A | | 5/1995 | Lee et al. |
| 5,423,178 A | | 6/1995 | Mains |
| 5,570,580 A | | 11/1996 | Mains |
| 5,577,386 A | | 11/1996 | Alary et al. |
| 5,615,555 A | | 4/1997 | Mina |
| 5,930,999 A | | 8/1999 | Howell et al. |
| 6,073,436 A | | 6/2000 | Bell et al. |
| 6,076,356 A | | 6/2000 | Pelletier |
| 6,082,112 A | | 7/2000 | Shekleton |
| 6,321,541 B1 | | 11/2001 | Wrubel et al. |
| 6,484,489 B1 | * | 11/2002 | Foust et al. ............. 60/776 |
| 2002/0116929 A1 | | 8/2002 | Snyder |
| 2002/0125336 A1 | | 9/2002 | Bretz |
| 2002/0134084 A1 | | 9/2002 | Mansour et al. |
| 2004/0148939 A1 | * | 8/2004 | Young ..................... 60/740 |

FOREIGN PATENT DOCUMENTS

EP           03253522         9/2003

* cited by examiner

*Primary Examiner*—Ehud Gartenberg
(74) *Attorney, Agent, or Firm*—William Scott Andes; Steven J. Rosen

(57) ABSTRACT

A fuel injector includes an annular nozzle housing circumscribed about a nozzle axis and an annular fuel nozzle circumscribed about the nozzle axis within the housing. The annular fuel nozzle has at least one main nozzle fuel circuit, a pilot nozzle fuel circuit, and spray orifices extending radially away from the main nozzle fuel circuit through the annular fuel nozzle. Spray wells extend radially through the nozzle housing and are aligned with the spray orifices. An asymmetric cyclone means is located radially outwardly of the housing for generating a swirling flow around the nozzle and an asymmetric static pressure differential around the housing. The asymmetric cyclone means may be a symmetrical radial inflow swirler circumscribed about a cyclone axis that is not collinear with the nozzle axis or may have a plurality of angled flow swirling elements angled with respect to and asymmetrically circumscribed about the cyclone axis.

47 Claims, 21 Drawing Sheets

DIFFERENTIAL PRESSURE INDUCED PURGING FUEL INJECTOR WITH ASYMMETRIC CYCLONE

BACKGROUND OF THE INVENTION

Field of the Invention

The present invention relates generally to gas turbine engine combustor fuel injectors and, more particularly, to fuel injectors with multiple injection orifices and fuel purging.

Fuel injectors, such as in gas turbine engines, direct pressurized fuel from a manifold to one or more combustion chambers. Fuel injectors also prepare the fuel for mixing with air prior to combustion. Each injector typically has an inlet fitting connected to the manifold, a tubular extension or stem connected at one end to the fitting, and one or more spray nozzles connected to the other end of the stem for directing the fuel into the combustion chamber. A fuel conduit or passage (e.g., a tube, pipe, or cylindrical passage) extends through the stem to supply the fuel from the inlet fitting to the nozzle. Appropriate valves and/or flow dividers can be provided to direct and control the flow of fuel through the nozzle. The fuel injectors are often placed in an evenly-spaced annular arrangement to dispense (spray) fuel in a uniform manner into the combustor chamber.

Control of local flame temperature over a wider range of engine airflow and fuel flow is needed to reduce emissions of oxides of nitrogen (NOx), unburned hydrocarbons (UHC), and carbon monoxide (CO) generated in the aircraft gas turbine combustion process. Local flame temperature is driven by local fuel air ratio (FAR) in combustor zones of the combustor. To reduce NOx, which is generated at high flame temperature (high local FAR), a preferred approach has been to design combustion zones for low local FAR at max power. Conversely, at part power conditions, with lower T3 and P3 and associated reduced vaporization/reaction rates, a relatively higher flame temperature and thus higher local FAR is required to reduce CO and UHC, but the engine cycle dictates a reduced overall combustor FAR relative to max power. These seemingly conflicting requirements have resulted in the design of fuel injectors incorporating fuel staging which allows varying local FAR by changing the number of fuel injection points and/or spray penetration/ mixing. Changing the number of fuel injection points is accomplished by shutting down some fuel circuits at part power. Fuel staging delivers engine fuel flow to fewer injection points at low power to raise local FAR sufficiently above acceptable levels for CO, UHC, and burnout. Fuel staging delivers engine fuel flow to more injection points at high power to maintain local FAR below levels associated with high NOx generation rates.

One example of fuel staging injector is disclosed in U.S. Pat. No. 6,321,541 and United States Patent Application No. 20020129606. This injector includes concentric radially outer main and radially inner pilot nozzles. The main nozzle is also referred to as a cyclone nozzle. The main nozzle has radially oriented injection holes that are staged and a pilot injection circuit which is always flowing fuel during engine operation. The fuel injector and a fuel conduit in the form of a single elongated laminated feed strip extend through the stem to the nozzle assemblies to supply fuel to the nozzle(s) in the nozzle assemblies. The laminate feed strip and nozzle are formed from a plurality of plates. Each plate includes an elongated, feed strip portion and a unitary head (nozzle) portion, substantially perpendicular to the feed strip portion. Fuel passages and openings in the plates are formed by selectively etching the surfaces of the plates. The plates are then arranged in surface-to-surface contact with each other and fixed together such as by brazing or diffusion bonding, to form an integral structure. Selectively etching the plates allows multiple fuel circuits, single or multiple nozzle assemblies and cooling circuits to be easily provided in the injector. The etching process also allows multiple fuel paths and cooling circuits to be created in a relatively small cross-section, thereby, reducing the size of the injector.

Because of limited fuel pressure availability and a wide range of required fuel flow, many fuel injectors include pilot and main nozzles, with only the pilot nozzles being used during start-up, and both nozzles being used during higher power operation. The flow to the main nozzles is reduced or stopped during start-up and lower power operation. Such injectors can be more efficient and cleaner-burning than single nozzle fuel injectors, as the fuel flow can be more accurately controlled and the fuel spray more accurately directed for the particular combustor requirement. The pilot and main nozzles can be contained within the same nozzle stem assembly or can be supported in separate nozzle assemblies. These dual nozzle fuel injectors can also be constructed to allow further control of the fuel for dual combustors, providing even greater fuel efficiency and reduction of harmful emissions.

High temperatures within the combustion chamber during operation and after shut-down require the use of purging of the main nozzle fuel circuits to prevent the fuel from breaking down into solid deposits (i.e., "coking") which occurs when the wetted walls in a fuel passage exceed a maximum temperature (approximately 400° F. or 200° C. for typical jet fuel). The coke in the fuel nozzle can build up and restrict fuel flow through the fuel nozzle rendering the nozzle inefficient or unusable.

To prevent failure due to coking the staged circuits should be purged of stagnant fuel and wetted walls either kept cool enough to prevent purge deposits (<550 F estimated non-flowing), or heated enough to burn away deposits (>800 F estimated), the latter being difficult to control without damaging the injector. Air available to purge the staged circuits is at T3, which varies so that it is impossible to satisfy either an always-cold or always-hot design strategy over the range of engine operation. A combination cold/hot strategy (i.e., use of a cleaning cycle) cannot be executed reliably due to the variety of end user cycles and the variability in deposition/cleaning rates expected.

Passive purging of fuel circuits has been used as disclosed in U.S. Pat. Nos. 5,277,023, 5,329,760, and 5,417,054. Reverse purge with pyrolytic cleaning of the injector circuits has been incorporated on the General Electric LM6000 and LM2500 DLE Dual Fuel engines, which must transition from liquid fuel to gaseous fuel at high power without shutting down. Stagnant fuel in the liquid circuits is forced backwards by hot compressor discharge air through all injectors into a fuel receptacle by opening drain valves on the manifold. This method is not suitable for aircraft applications due to safety, weight, cost, and maintenance burden. Forward purge of staged fuel circuits has been used on land based engines, but requires a high pressure source of cool air and valves that must isolate fuel from the purge air source, not suitable for aircraft applications.

Fuel circuits in the injector that remain flowing should be kept even cooler (<350 F estimated) than the staged circuit that is purging, as deposition rates are higher for a flowing fuel circuit. Thus, the purged circuit should either be thermally isolated from the flowing circuits, forcing the use of a cleaning cycle, or intimately cooled by the flowing circuits satisfying both purged and flowing wall temperature limits.

It is highly desirable to have a fuel injector and nozzle suitable for fuel staging using multiple circuit injectors with multiple point nozzles that require some circuits to flow fuel while other circuits in the same injector are purged. It is also desirable to have a suitable fuel injector and nozzle that allows the use of a valve in the injector to prevent shutdown drainage of supply tubes and to provide pressurization for good flow distribution at low fuel flows. It is very difficult to purge internal fuel circuits, requiring high flow rate of purge air that is relatively hot at some engine conditions. Thus it is highly desirable to cool the purge air to acceptable temperatures prior to entering the circuit being purged to prevent overheating the fuel conduit locally at the ingestion sites.

BRIEF DESCRIPTION OF THE INVENTION

A fuel injector includes an annular nozzle housing circumscribed about a nozzle axis and an annular main fuel nozzle circumscribed about the nozzle axis within the housing. The annular main fuel nozzle has at least one main nozzle fuel circuit and a pilot nozzle fuel circuit. Spray orifices extend radially away from the main nozzle fuel circuit through the annular fuel nozzle. Spray wells extend radially through the nozzle housing and are aligned with the spray orifices. An asymmetric cyclone means is located radially outwardly of the housing for generating a swirling flow and an asymmetric static pressure differential around the housing for at least in part purging the main nozzle fuel circuit between two of the spray wells.

One embodiment of the asymmetric cyclone means is a symmetrical radial inflow swirler circumscribed about a cyclone axis which is not collinear with the nozzle axis. The cyclone axis may be spaced apart from and parallel to the nozzle axis or in another embodiment the cyclone axis is skewed from the nozzle axis. Another embodiment of the asymmetric cyclone means includes a plurality of angled flow swirling elements angled with respect to and asymmetrically circumscribed about the cyclone axis. The cyclone axis may be collinear with the nozzle axis. Various embodiments of the angled flow swirling elements include swirl vanes asymmetrically spaced about the cyclone axis, swirl vanes having an asymmetrical swirl angle variation about the cyclone axis, swirl vanes having an asymmetrical vane thickness variation about the cyclone axis, swirl slots asymmetrically spaced around the cyclone axis, swirl slots asymmetrically angled with respect to the cyclone axis, or swirl slots having an asymmetrical slot thickness variation about the cyclone axis.

One embodiment of the annular fuel nozzle is formed from a single feed strip having a single bonded together pair of lengthwise extending plates. Each of the plates has a single row of widthwise spaced apart and lengthwise extending parallel grooves. The plates are bonded together such that opposing grooves in each of the plates are aligned forming the main nozzle fuel circuit and the pilot nozzle fuel circuit. One embodiment of the pilot nozzle fuel circuit includes clockwise and counterclockwise extending annular legs having parallel first and second waves, respectively. The spray orifices are located in alternating ones of the first and second waves so as to be substantially aligned along a circle.

The housing may have a purge means for purging the main nozzle fuel circuit while the pilot nozzle fuel circuit supplies fuel to the pilot fuel nozzle. In one more particular embodiment of the housing, the spray wells have at least two types of the well portions chosen from a group consisting of symmetrically flared out well portions, asymmetrically upstream flared out well portions flared outwardly with respect to the spray well centerline in a local upstream direction, and asymmetrically downstream flared out well portions flared outwardly with respect to the spray well centerline in a local downstream direction. Adjacent ones of the spray orifices in each of the clockwise and the counter-clockwise extending annular legs may be aligned with spray wells having different types of the well portions chosen from the group. The main nozzle fuel circuit may have first and second fuel circuit branches with a purge flow control valve operably disposed between the first and second fuel circuit branches.

DETAILED DESCRIPTION OF THE INVENTION

Figure 1:
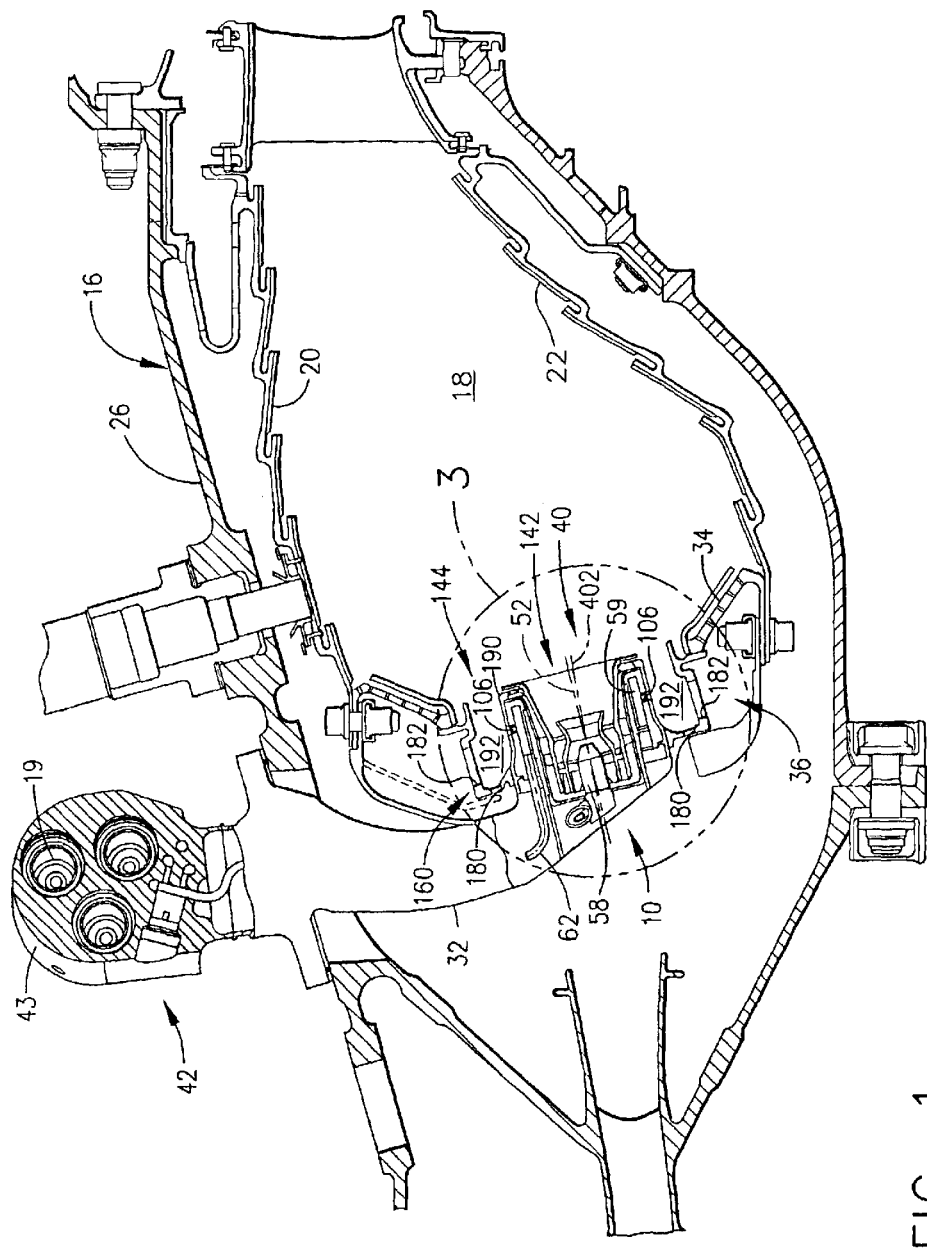
FIG. 1 is a cross-sectional view illustration of a gas turbine engine combustor with an exemplary embodiment of a fuel nozzle assembly having an asymmetric cyclone.

Illustrated in FIG. 1 is an exemplary embodiment of a combustor 16 including a combustion zone 18 defined between and by annular, radially outer and radially inner liners 20 and 22, respectively. The outer and inner liners 20 and 22 are located radially inwardly of an annular combustor casing 26 which extends circumferentially around outer and inner liners 20 and 22. The combustor 16 also includes an annular dome 34 mounted upstream from outer and inner liners 20 and 22. The dome 34 defines an upstream end 36 of the combustion zone 18 and a plurality of mixer assemblies 40 (only one is illustrated) are spaced circumferentially around the dome 34. Each mixer assembly 40 includes pilot and main fuel nozzles 58 and 59, respectively, and delivers a mixture of fuel and air to the combustion zone 18. Each mixer assembly 40 has a nozzle axis 52 about which the pilot and main fuel nozzles 58 and 59 are circumscribed.

Figure 2:
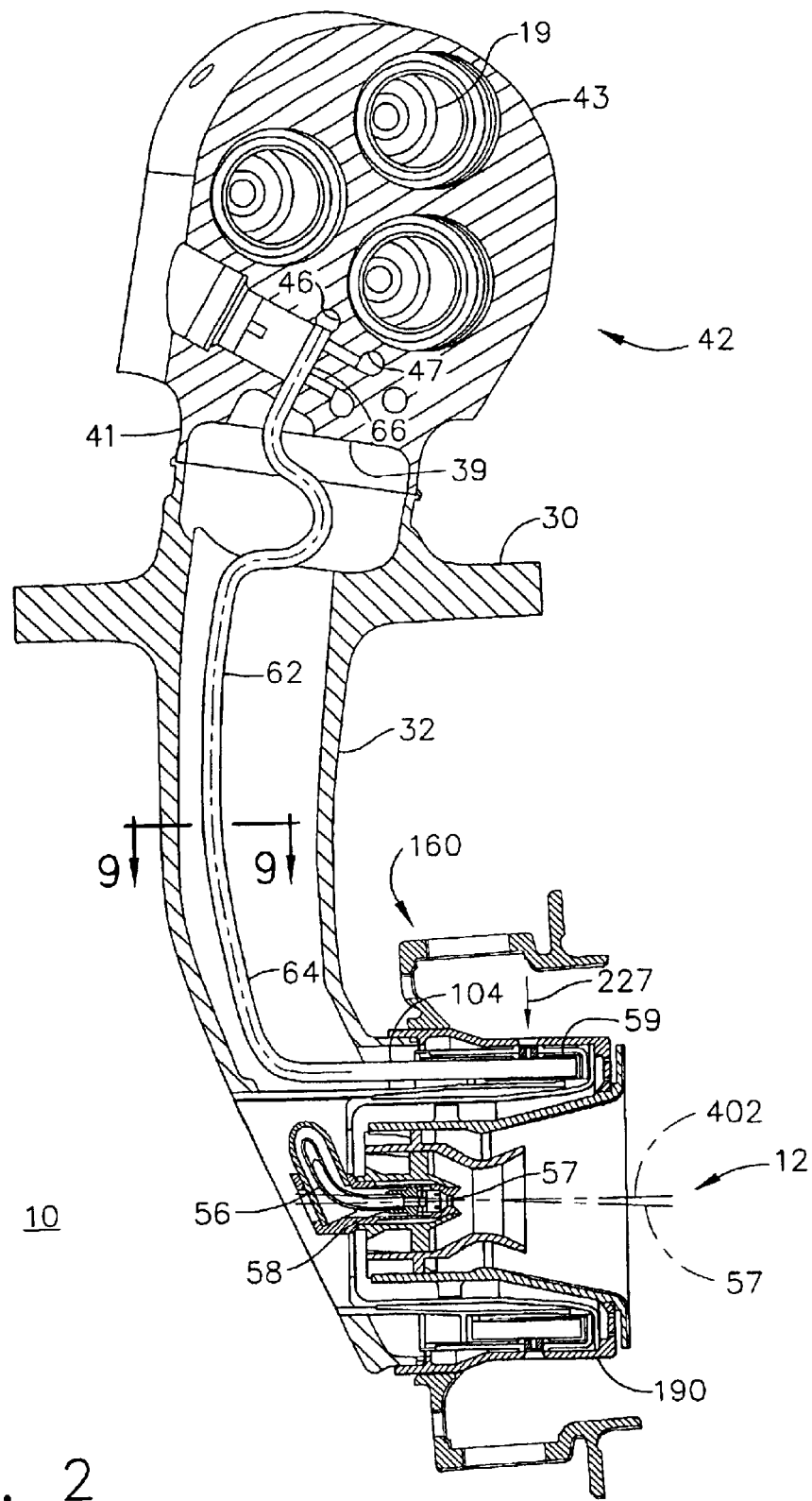
FIG. 2 is an enlarged cross-sectional view illustration of a fuel injector with the fuel nozzle assembly illustrated in FIG. 1.

Referring to FIGS. 1 and 2, an exemplary embodiment of a fuel injector 10 of the present invention has a fuel nozzle tip assembly 12 (more than one radially spaced apart nozzle assemblies may be used) that includes the pilot and main fuel nozzles 58 and 59, respectively, for directing fuel into the combustion zone of a combustion chamber of a gas turbine engine. The fuel injector 10 includes a nozzle mount or flange 30 adapted to be fixed and sealed to the combustor casing 26. A hollow stem 32 is integral with or fixed to the flange 30 (such as by brazing or welding) and supports the fuel nozzle tip assembly 12 and the mixer assembly 40.

The hollow stem 32 has a valve assembly 42 disposed above or within an open upper end of a chamber 39 and is integral with or fixed to flange 30 such as by brazing or welding. The valve assembly 42 includes an inlet assembly 41 which may be part of a valve housing 43 with the hollow stem 32 depending from the housing. The valve assembly 42 includes fuel valves 45 to control fuel flow through a main nozzle fuel circuit 102 and a pilot nozzle fuel circuit 288 in the fuel nozzle tip assembly 12.

The valve assembly 42 as illustrated in FIG. 2 is integral with or fixed to and located radially outward of the flange 30 and houses fuel valve receptacles 19 for housing the fuel valves 45. The nozzle tip assembly 12 includes the pilot and main fuel nozzles 58 and 59, respectively. Generally, the pilot and main fuel nozzles 58 and 59 are used during normal and extreme power situations while only the pilot fuel nozzle is used during start-up and part power operation. An exemplary flexible fuel injector conduit in the form of a single elongated feed strip 62 is used to provide fuel from the valve assembly 42 to the nozzle tip assembly 12. The feed strip 62 is a flexible feed strip formed from a material which can be exposed to combustor temperatures in the combustion chamber without being adversely affected.

Figure 8:
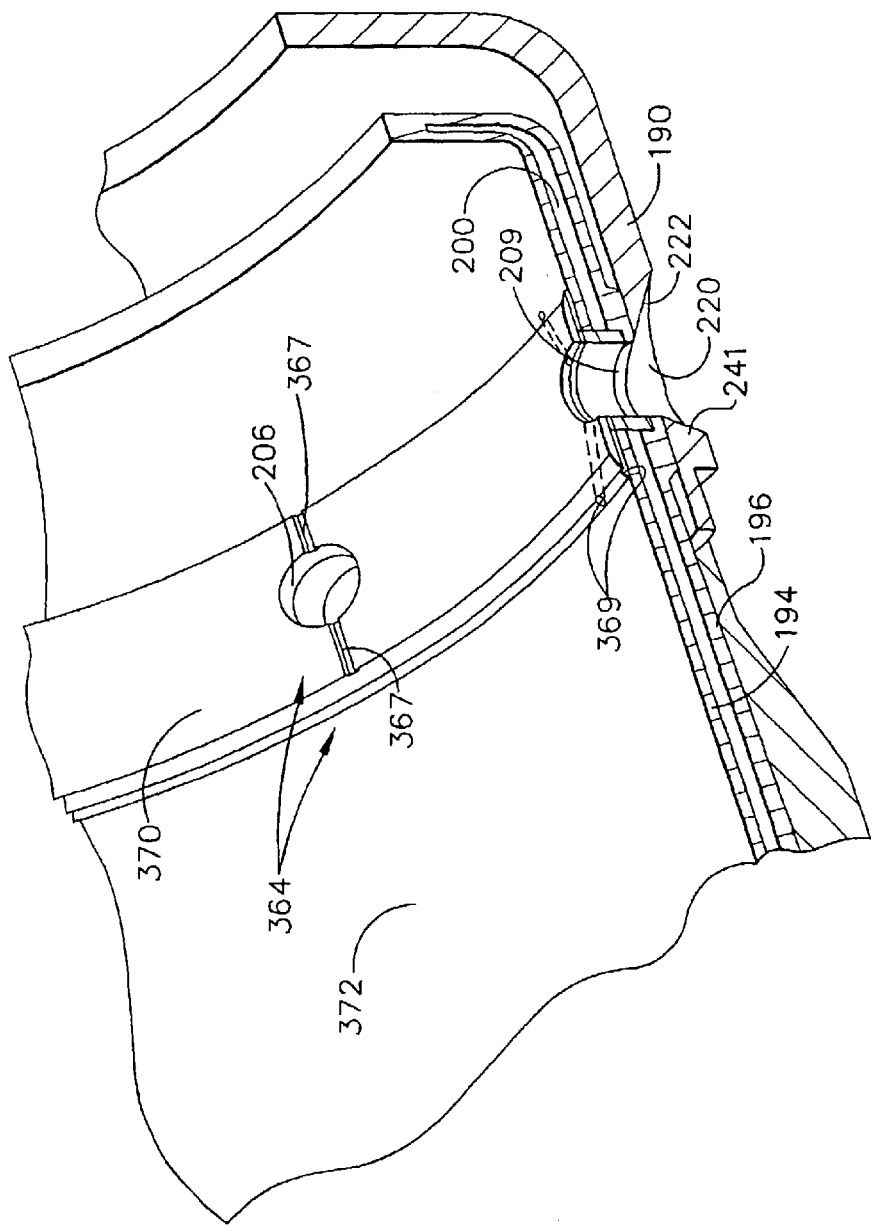
FIG. 8 is a radially outwardly looking perspective view illustration of the spray well and portions of heat shields surrounding the main nozzle illustrated in FIG. 7.
Figure 9:
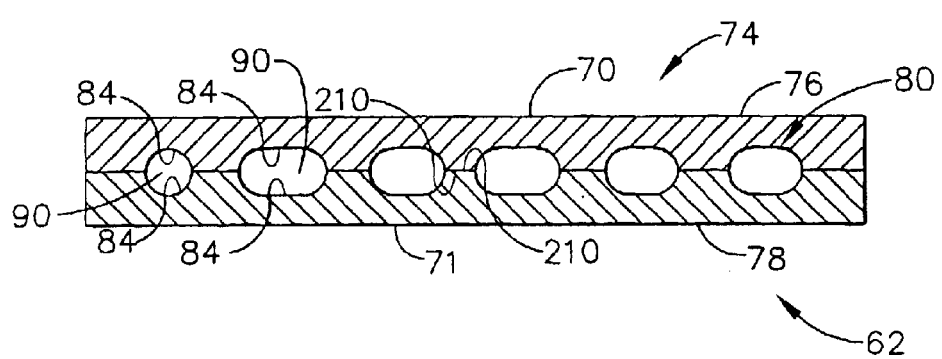
FIG. 9 is a cross-sectional view illustration of the fuel strip taken though 9—9 illustrated in FIG. 2.
Figure 10:
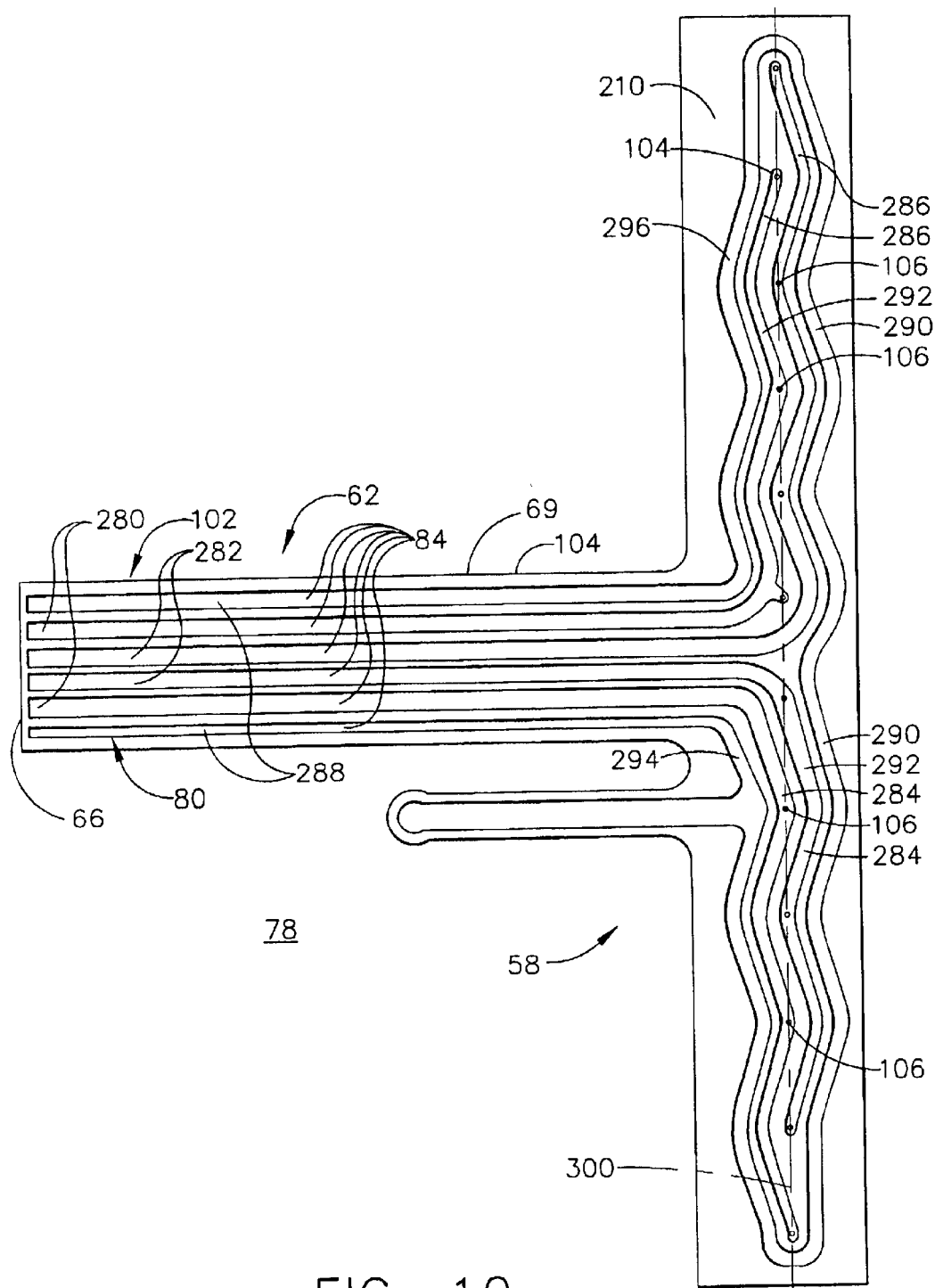
FIG. 10 is a top view illustration of a plate used to form the fuel strip illustrated in FIG.

Referring to FIGS. 9 and 10, the feed strip 62 has a single bonded together pair of lengthwise extending first and second plates 76 and 78. Each of the first and second plates 76 and 78 has a single row 80 of widthwise spaced apart and lengthwise extending parallel grooves 84. The plates are bonded together such that opposing grooves 84 in each of the plates are aligned forming internal fuel flow passages 90 through the feed strip 62 from an inlet end 66 to an outlet end 69 of the feed strip 62. A pilot nozzle extension 54 extends aftwardly from the main fuel nozzle 59 and is fluidly connected to a fuel injector tip 57 of the pilot fuel nozzle 58 by the pilot feed tube 56 as further illustrated in FIG. 2. The feed strip 62 feeds the main fuel nozzle 59 and the pilot fuel nozzle 58 as illustrated in FIGS. 2, 3, 11, and 12. Referring to FIGS. 12 and 8, the pilot nozzle extension 54 and the pilot feed tube 56 are generally angularly separated about the nozzle axis 52 by an angle AA.

Referring to FIGS. 2 and 12, the feed strip 62 has a substantially straight radially extending middle portion 64 between the inlet end 66 and the outlet end 69. A straight header 104 of the fuel feed strip 62 extends transversely (in an axially aftwardly direction) away from the outlet end 69 of the middle portion 64 and leads to the main fuel nozzle 59 which is secured thus preventing deflection. The inlet end 66 is fixed within a valve housing 43. The header 104 is generally parallel to the nozzle axis 52 and leads to the main fuel nozzle 59. The feed strip 62 has an elongated essentially flat shape with substantially parallel first and second side surfaces 70 and 71 and a rectangular cross-sectional shape 74 as illustrated in FIG. 9.

Figure 11:
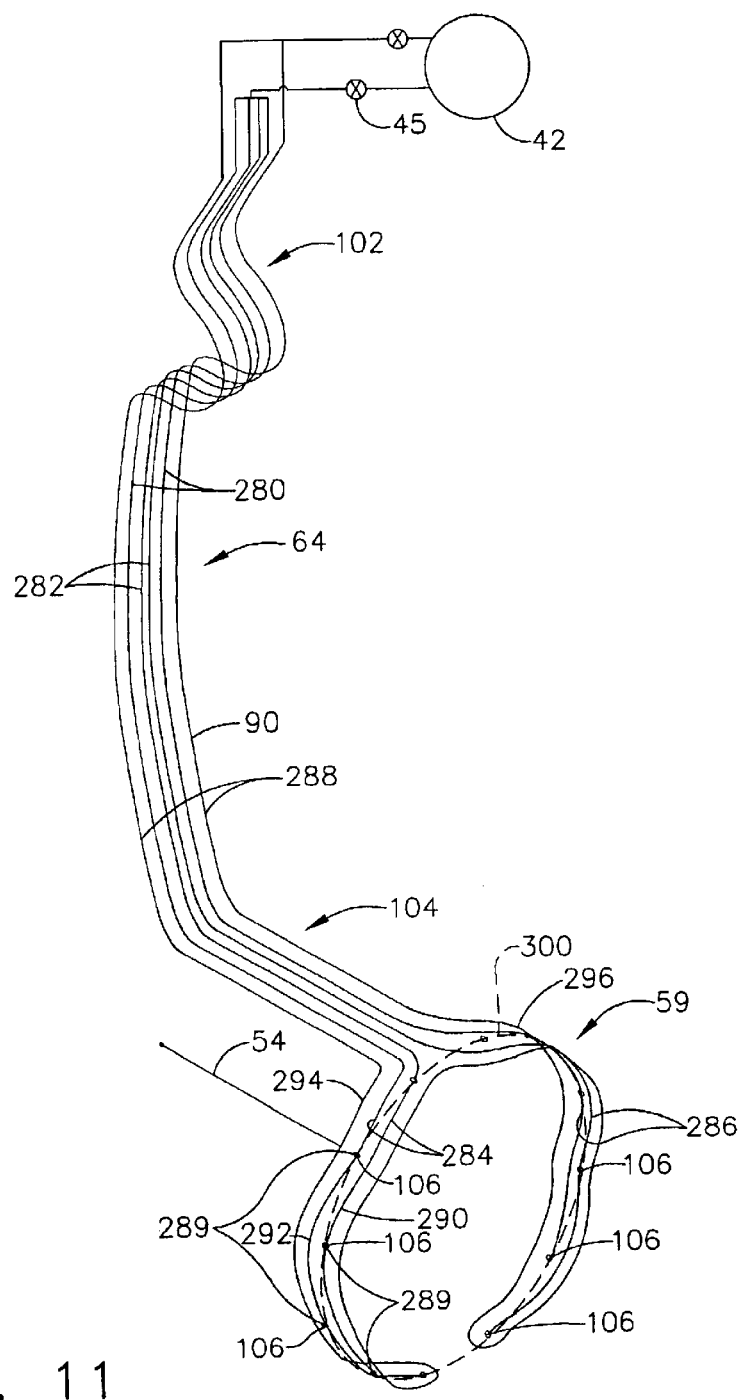
FIG. 11 is a schematic illustration of fuel circuits of the fuel injector illustrated in FIG. 1.
Figure 12:
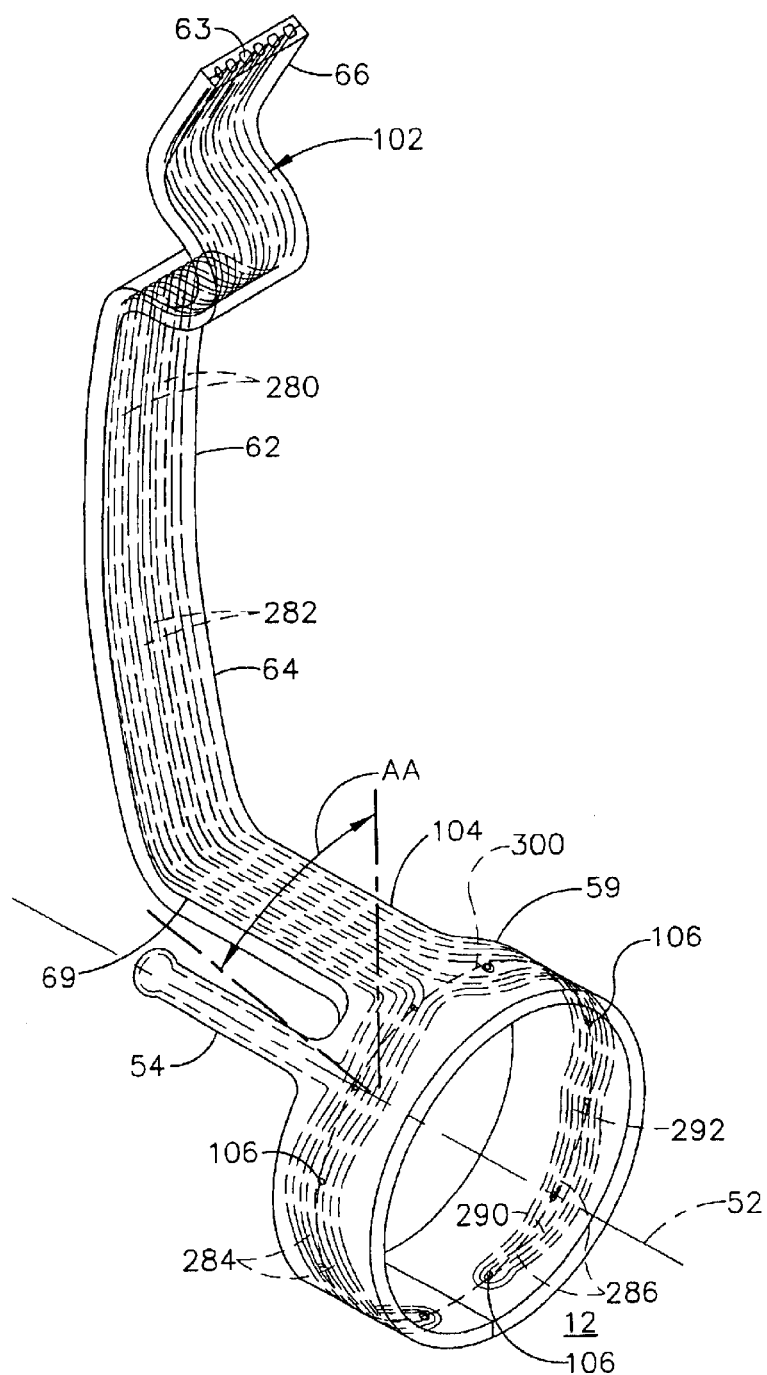
FIG. 12 is a perspective view illustration of the fuel strip with the fuel circuits illustrated in FIG. 11.

Referring to FIGS. 2 and 11, the inlets 63 at the inlet end 66 of the feed strip 62 are in fluid flow communication with or fluidly connected to first and second fuel inlet ports 46 and 47, respectively, in the valve assembly 42 to direct fuel into the main nozzle fuel circuit 102 and the pilot nozzle fuel circuit 288. The inlet ports feed the multiple internal fuel flow passages 90 in the feed strip 62 to the pilot fuel nozzle 58 and main fuel nozzle 59 in the nozzle tip assembly 12 as well as provide cooling circuits for thermal control in the nozzle assembly. The header 104 of the nozzle tip assembly 12 receives fuel from the feed strip 62 and conveys the fuel to the main fuel nozzle 59 and, where incorporated, to the pilot fuel nozzle 58 through the main nozzle fuel circuits 102 as illustrated in FIGS. 11 and 12.

Figure 3:
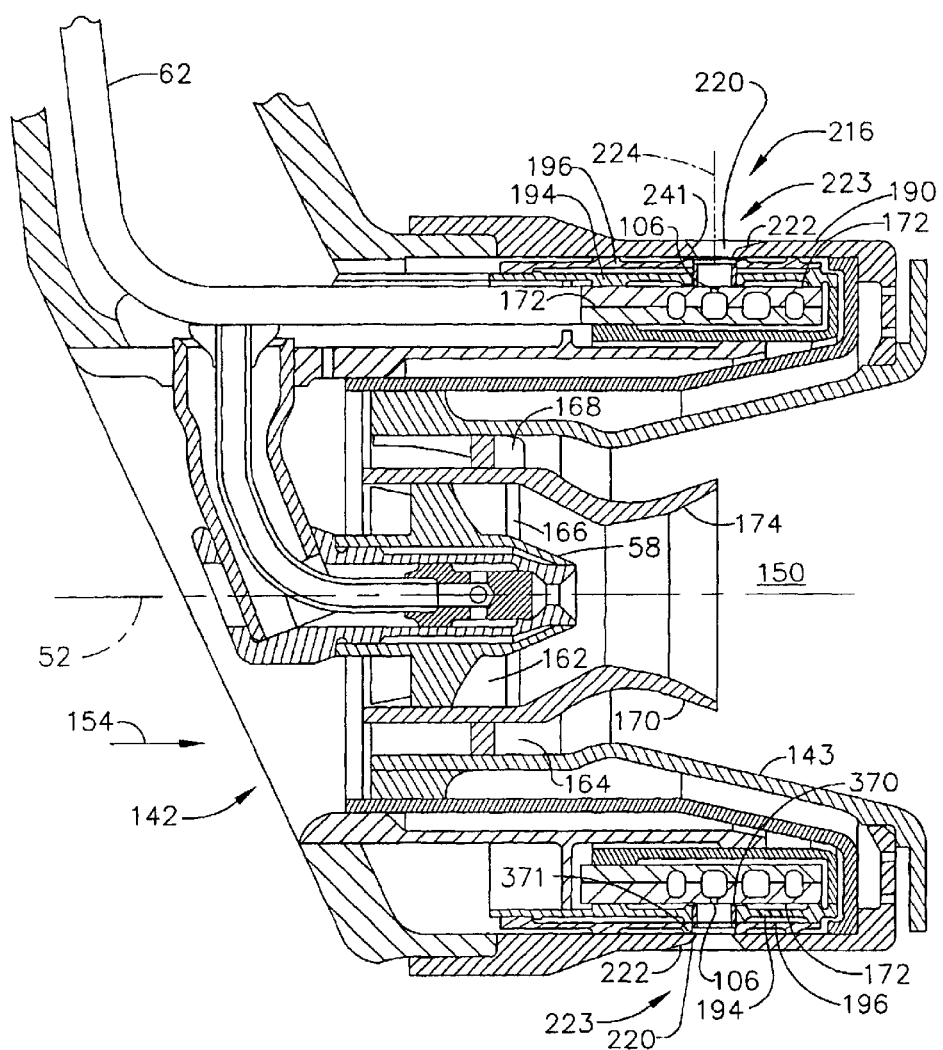
FIG. 3 is an enlarged cross-sectional view illustration of the fuel nozzle assembly illustrated in FIG. 2.

The feed strip 62, the main fuel nozzle 59, and the header 104 therebetween are integrally constructed from the lengthwise extending first and second plates 76 and 78. The main fuel nozzle 59 and the header 104 may be considered to be elements of the feed strip 62. The fuel flow passages 90 of the main nozzle fuel circuits 102 run through the feed strip 62, the header 104, and the main fuel nozzle 59. The fuel passages 90 of the main nozzle fuel circuits 102 lead to spray orifices 106 and through the pilot nozzle extension 54 which is operable to be fluidly connected to the pilot feed tube 56 to feed the pilot fuel nozzle 58 as illustrated in FIGS. 2, 3, and 12. The parallel grooves 84 of the fuel flow passages 90 of the main nozzle fuel circuits 102 are etched into adjacent surfaces 210 of the first and second plates 76 and 78 as illustrated in FIGS. 9 and 10.

Referring to FIGS. 10, 11, and 12, the main nozzle fuel circuit 102 includes a single trunk line 287 connected to first and second fuel circuit branches 280 and 282. Each of the first and second fuel circuit branches 280 and 282 includes main clockwise and counterclockwise extending annular legs 284 and 286, respectively, in the main fuel nozzle 59. The spray orifices 106 extend from the annular legs 284 and 286 through one or both of the first and second plates 76 and 78. The spray orifices 106 radially extend outwardly through the first plate 76 of the main fuel nozzle 59 which is the radially outer one of the first and second plates 76 and 78. The clockwise and counterclockwise extending annular legs 284 and 286 have parallel first and second waves 290 and 292, respectively. The spray orifices 106 are located in alternating ones of the first and second waves 290 and 292 so as to be substantially circularly aligned along a circle 300. The main nozzle fuel circuits 102 also include a looped pilot nozzle fuel circuit 288 that feeds the pilot nozzle extension 54. The looped pilot nozzle fuel circuit 288 includes clockwise and counterclockwise extending annular pilot legs 294 and 296, respectively, in the main fuel nozzle 59.

See U.S. Pat. No. 6,321,541 for information on nozzle assemblies and fuel circuits between bonded plates. Referring to FIGS. 11 and 12, the internal fuel flow passages 90 down the length of the feed strips 62 are used to feed fuel to the main nozzle fuel circuits 102. Fuel going into each of the internal fuel flow passages 90 in the feed strips 62 and the header 104 into the pilot and main nozzles 58 and 59 is controlled by fuel valves 45. The header 104 of the nozzle tip assembly 12 receives fuel from the feed strips 62 and conveys the fuel to the main fuel nozzle 59. The main fuel nozzle 59 is annular and has a cylindrical shape or configuration. The flow passages, openings and various components of the spray devices in plates 76 and 78 can be formed in any appropriate manner such as by etching and, more specifically, chemical etching. The chemical etching of such plates should be known to those skilled in the art and is described for example in U.S. Pat. No. 5,435,884. The etching of the plates allows the forming of very fine, well-defined, and complex openings and passages, which allow multiple fuel circuits to be provided in the feed strips 62 and main fuel nozzle 59 while maintaining a small cross-section for these components. The plates 76 and 78 can be bonded together in surface-to-surface contact with a bonding process such as brazing or diffusion bonding. Such bonding processes are well-known to those skilled in the art and provides a very secure connection between the various plates. Diffusion bonding is particularly useful as it causes boundary cross-over (atom interchange and crystal growth) across the original interface between the adjacent layers.

Referring to FIGS. 1, 2, and 3, each mixer assembly 40 includes a pilot mixer 142, a main mixer 144, and a centerbody 143 extending therebetween. The centerbody 143 defines a chamber 150 that is in flow communication with, and downstream from, the pilot mixer 142. The pilot fuel nozzle 58 is supported by the centerbody 143 within the chamber 150. The pilot fuel nozzle 58 is designed for spraying droplets of fuel downstream into the chamber 150. The main mixer 144 includes a main axial swirler 180 located upstream of a radial inflow swirler 182 located upstream from the spray orifices 106. The pilot mixer 142 includes a pair of concentrically mounted pilot swirlers 160. The pilot swirlers 160 are illustrated as axial swirlers and include inner pilot swirlers 162 and an outer pilot swirler 164. The inner pilot swirler 162 is annular and is circumferentially disposed around the pilot fuel nozzle 58. Each of the inner and outer pilot swirlers 162 and 164 includes a plurality of inner and outer pilot swirling vanes 166 and 168, respectively, positioned upstream from pilot fuel nozzle 58.

Referring more particularly to FIG. 3, an annular pilot splitter 170 is radially disposed between the inner and outer pilot swirlers 162 and 164 and extends downstream from the inner and outer pilot swirlers 162 and 164. The pilot splitter 170 is designed to separate pilot mixer airflow 154 traveling through inner pilot swirler 162 from airflow flowing through the outer pilot swirler 164. The pilot splitter 170 has a converging-diverging inner surface 174 that provides a fuel-filming surface during engine low power operations. The pilot splitter 170 also reduces axial velocities of the pilot mixer airflow 154 flowing through the pilot mixer 142 to allow recirculation of hot gases. The inner pilot swirler vanes 166 may be arranged to swirl air flowing therethrough in the same direction as air flowing through the outer pilot swirler vanes 168 or in a first circumferential direction that is opposite a second circumferential direction that the outer pilot swirler vanes 168 swirl air flowing therethrough.

Referring more particularly to FIG. 1, the main mixer 144 includes an annular nozzle housing 190 that defines an annular cavity 192. The main mixer 144 is a radial inflow mixer or cyclone concentrically aligned with respect to the pilot mixer 142 and extends circumferentially around the pilot mixer 142. The main mixer 144 produces a swirled main mixer airflow 156 along the nozzle housing 190. The annular main fuel nozzle 59 is circumferentially disposed between the pilot mixer 142 and the main mixer 144. More specifically, main fuel nozzle 59 extends circumferentially around the pilot mixer 142 and is radially located outwardly of the centerbody 143 and within the annular cavity 192 of the nozzle housing 190.

Figure 5:
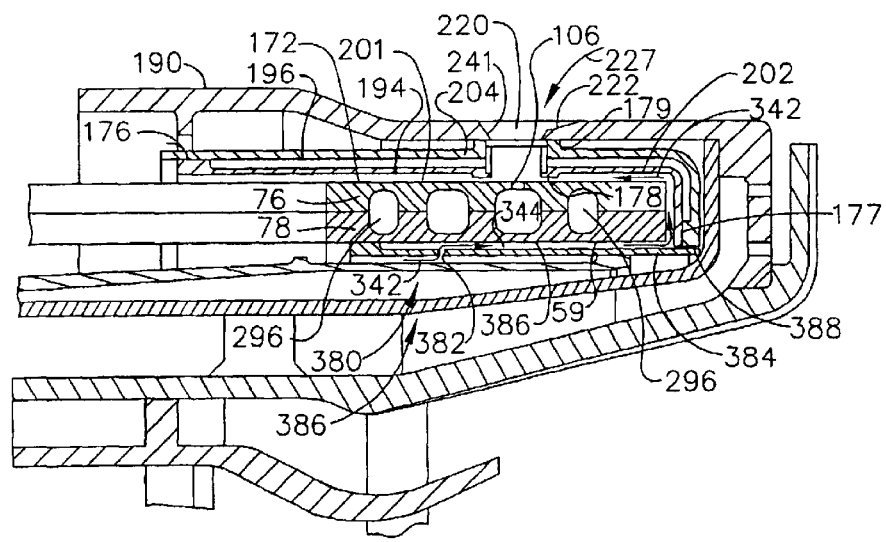
FIG. 5 is an enlarged cross-sectional view illustration of a portion of a second alternative fuel nozzle assembly with cooled purge air.

Referring more particularly to FIG. 3, the nozzle housing 190 includes spray wells 220 through which fuel is injected from the spray orifices 106 of the main fuel nozzle 59 into the main mixer airflow 156. Annular radially inner and outer heat shields 194 and 196 are radially located between the main fuel nozzle 59 and an outer annular nozzle wall 172 of the nozzle housing 190. The inner and outer heat shields 194 and 196 includes radially inner and outer walls 202 and 204, respectively, and there is a 360 degree annular gap 200 therebetween. Three hundred sixty degree inner and outer bosses 370 and 371 (further illustrated in FIG. 7) extend radially inwardly and outwardly from inner and outer heat shields 194 and 196, respectively. The inner and outer heat shields 194 and 196 each include a plurality of openings 206 through the inner and outer bosses 370 and 371 and aligned with the spray orifices 106 and the spray wells 220. The inner and outer heat shields 194 and 196 are fixed to the stem 32 (illustrated in FIG. 1) in an appropriate manner, such as by welding or brazing. Illustrated in FIG. 5 are the inner and outer heat shields 194 and 196 brazed together at forward and aft braze joints 176 and 177. The inner and outer bosses 370 and 371 are brazed to the main fuel nozzle 59 and the main fuel nozzle housing 190, respectively, at inner and outer braze joints 178 and 179.

The main fuel nozzle 59 and the spray orifices 106 inject fuel radially outwardly into the cavity 192 though the openings 206 in the inner and outer heat shields 194 and 196. An annular slip joint seal 208 is disposed in each set of the openings 206 in the inner heat shield 194 aligned with each one of the spray orifices 106 to prevent cross-flow through the annular gap 200. The annular slip joint seal 208 is radially trapped between the outer wall 204 and an annular ledge 209 of the inner wall 202 at a radially inner end of a counter bore 211 of the inner wall 202. The annular slip joint seal 208 may be attached to the inner wall 202 of the inner heat shield 194 by a braze or other method.

Referring to FIGS. 1 and 2, the radial inflow swirler 182 represents an exemplary asymmetric cyclone means 400 located radially outwardly of the housing 190 for generating a swirling flow and an asymmetric static pressure differential around the housing. The asymmetric cyclone means 400 is used at least in part to purge the main nozzle fuel circuit 102 between at least two of the spray wells 220 and is illustrated as being capable of purging the entire main nozzle fuel circuit.

Figure 25:
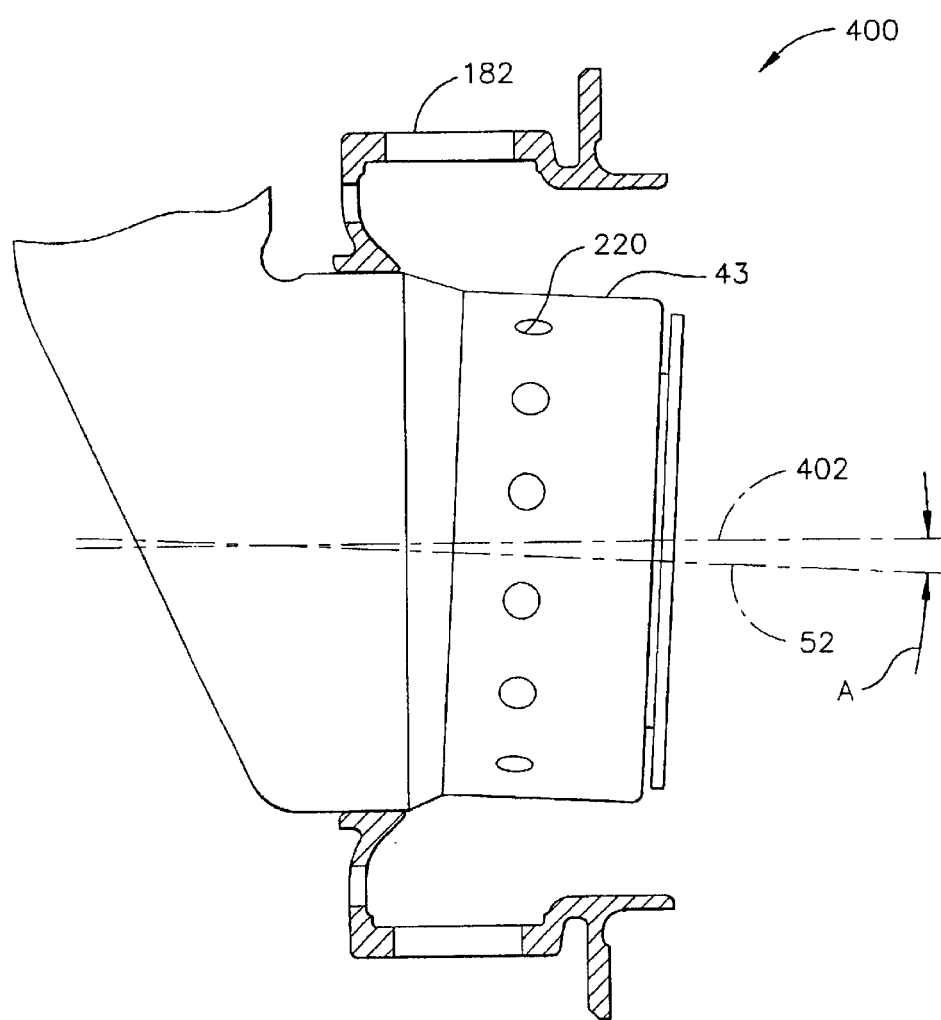
FIG. 25 is an enlarged side view illustration through of the asymmetric cyclone with a cyclone axis skewed from a nozzle axis as illustrated in FIGS. 1 and 2.
Figure 26:
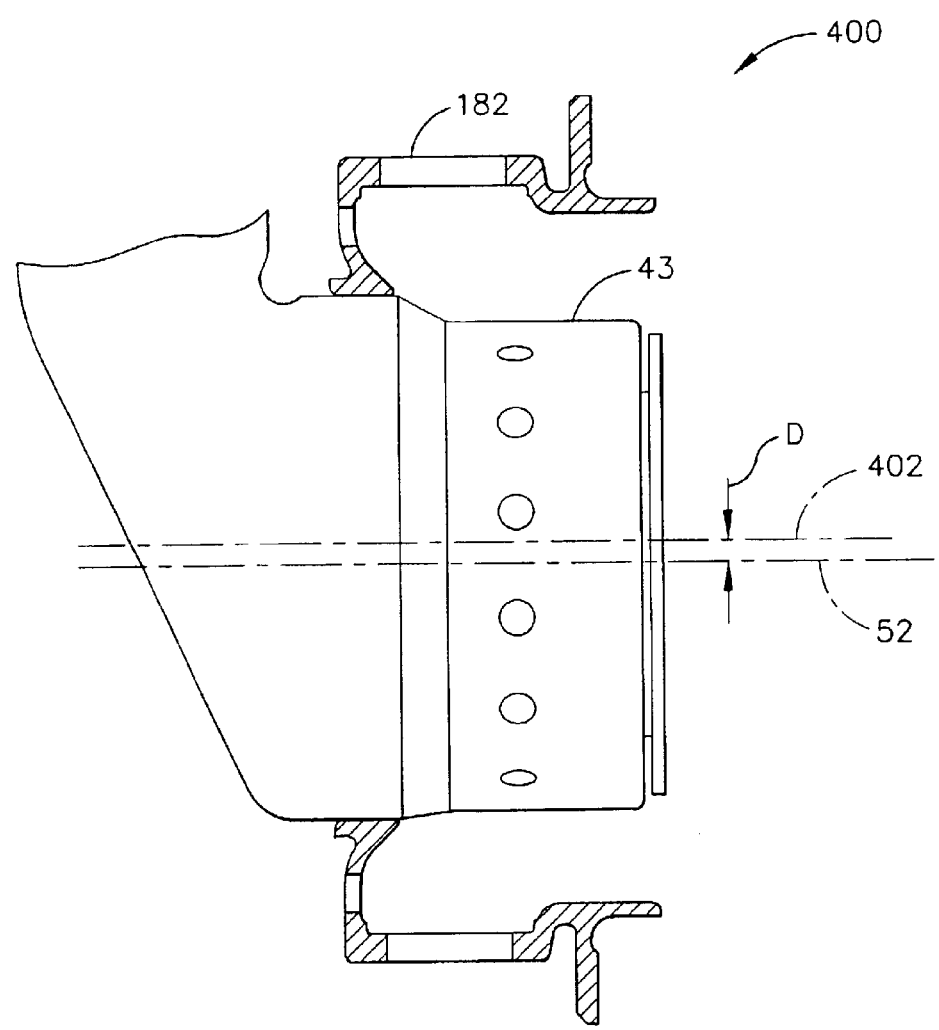
FIG. 26 is an enlarged side view illustration through of the asymmetric cyclone with the cyclone axis parallel to and offset from the nozzle axis.

Illustrated in FIGS. 1 and 25 is a first exemplary embodiment of the asymmetric cyclone means 400 in which a symmetrical radial inflow swirler 182 is circumscribed about a cyclone axis 402 which is not collinear with the nozzle axis 52 and is skewed from the nozzle axis 52. The cyclone axis 402 is illustrated as being skewed from the nozzle axis 52 by a skew angle A of about 3 degrees. Illustrated in FIG. 26 is another exemplary embodiment of the asymmetric cyclone means 400 in which the symmetrical radial inflow swirler 182 circumscribed about the cyclone axis 402 is spaced apart an offset distance D from and parallel to the nozzle axis 52.

Figure 27:
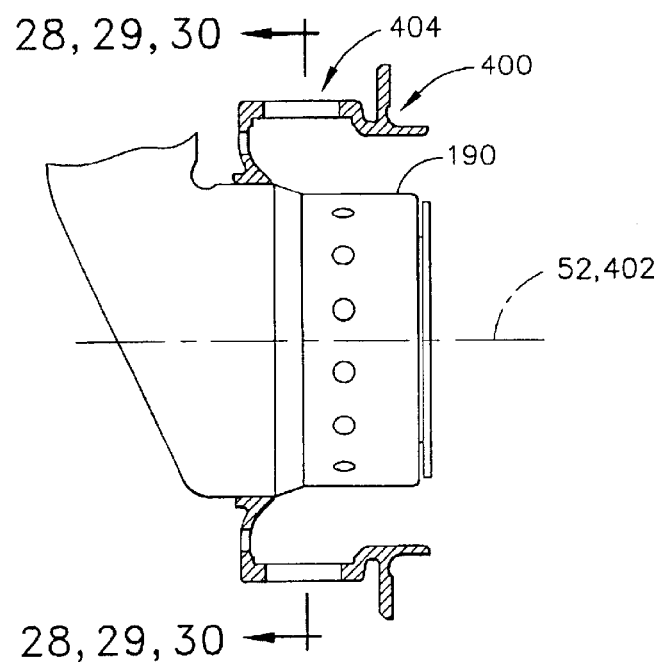
FIG. 27 is an enlarged side view illustration through of the asymmetric cyclone with the cyclone axis skewed collinear with the nozzle axis as illustrated in FIGS. 1 and 2.
Figure 28:
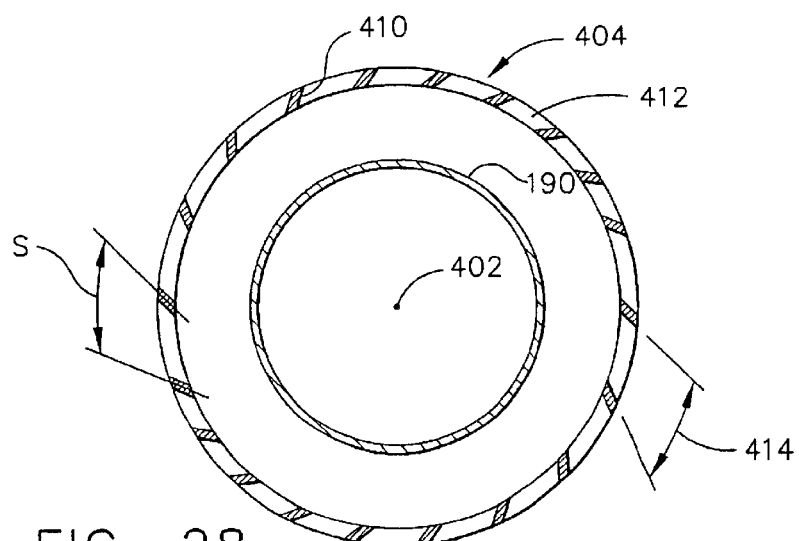
FIG. 28 is aft looking forward view illustration through 28—28 in FIG. 27 of the asymmetric cyclone with an asymmetrical swirl angle variation about the cyclone axis.

Illustrated in FIG. 27 is yet another exemplary embodiment of the asymmetric cyclone means 400 which includes a plurality of angled flow swirling elements 404 angled with respect to and asymmetrically circumscribed about the cyclone axis 402 which may be collinear with the nozzle axis 52 as illustrated herein. Alternatively, the cyclone axis 402 may be skewed from or spaced apart from the nozzle axis 52 as described above. One embodiment of the angled flow swirling elements 404 include swirl vanes 410 asymmetrically spaced around the cyclone axis 402 such that a circumferential distance S between adjacent ones of the swirl vanes 410 is not constant and varies asymmetrically around the cyclone axis 402 as illustrated in FIG. 28.

Figure 29:
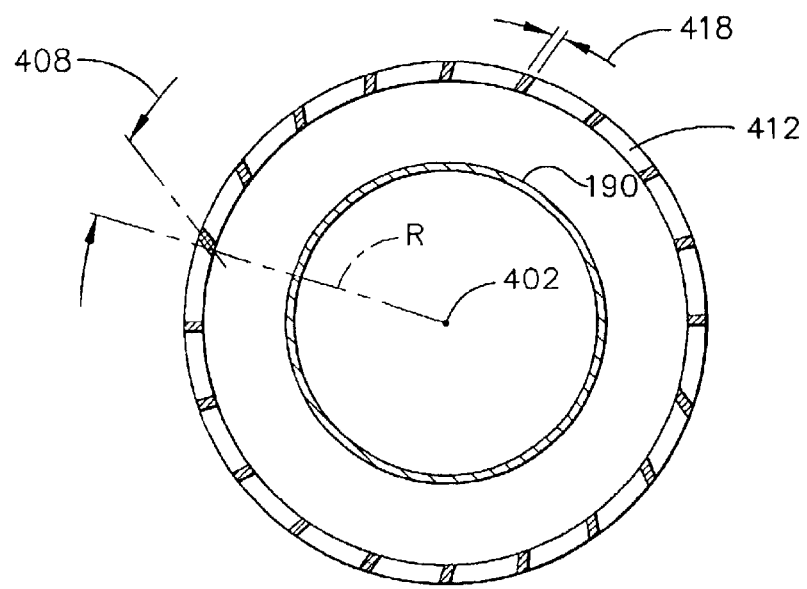
FIG. 29 is aft looking forward view illustration through 29—29 in FIG. 27 of the asymmetric cyclone with swirl vanes having an asymmetrical vane thickness variation about the cyclone axis.
Figure 30:
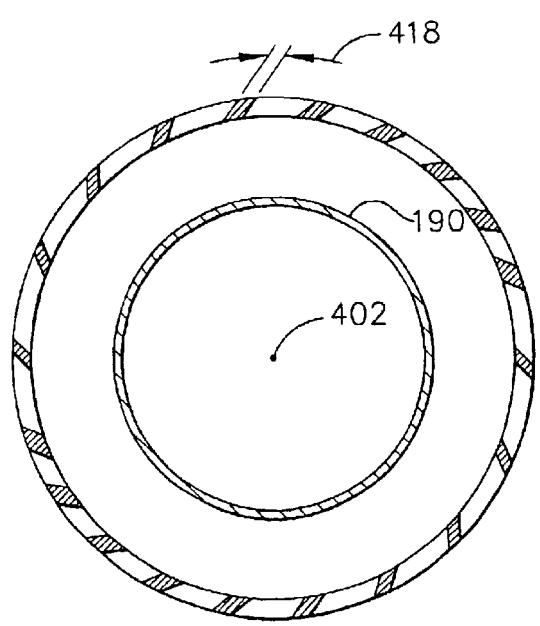
FIG. 30 is aft looking forward view illustration through 30—30 in FIG. 27 of the asymmetric cyclone with swirl vanes having an asymmetrical slot thickness variation about the cyclone axis.

In another embodiment of the angled flow swirling elements 404 the swirl vanes 410 have an asymmetrical swirl angle 408 variation about the cyclone axis 402 as illustrated in FIG. 29. The swirl angles 408 are measured with respect to radii R normal to the cyclone axis 402. In another embodiment of the angled flow swirling elements 404, the swirl vanes 410 have an asymmetrical vane thickness 418 variation about the cyclone axis 402 as illustrated in FIG. 30. The angled flow swirling elements 404 may be swirl slots 412 that are asymmetrically spaced apart about the cyclone axis 402 as illustrated in FIG. 28. The swirl slots 412 may be asymmetrically angled with respect to the cyclone axis 402 or have an asymmetrical slot thickness 414 variation about the cyclone axis 402.

One embodiment of the annular fuel nozzle 59 is formed from a single feed strip 62 having a single bonded together pair of lengthwise extending plates 76 and 78. Each of the plates has a single row 80 of widthwise spaced apart and lengthwise extending parallel grooves 84. The plates are bonded together such that opposing grooves 84 in each of the plates are aligned forming the main nozzle fuel circuit 102 and the pilot nozzle fuel circuit 288. One embodiment of the pilot nozzle fuel circuit 288 includes clockwise and counterclockwise extending annular legs 284 and 286 having parallel first and second waves 290 and 292, respectively. The spray orifices 106 are located in alternating ones of the first and second waves 290 and 292 so as to be substantially aligned along a circle 300.

The housing 190 may have a purge means 216 for purging the main nozzle fuel circuit 102 while the pilot nozzle fuel circuit 288 supplies fuel to the pilot fuel nozzle 58. In one more particular embodiment of the housing, the spray wells 220 have at least two types of the well portions chosen from a group consisting of symmetrically flared out well portions 218, asymmetrically upstream flared out well portions 221 flared outwardly with respect to the spray well centerline 224 in a local upstream direction 226, and asymmetrically downstream flared out well portions 222 flared outwardly with respect to the spray well centerline 224 in a local downstream direction 228. Adjacent ones of the spray orifices 106 in each of the clockwise and the counterclockwise extending annular legs 284 and 286 may be aligned with spray wells 220 having different types of the well portions chosen from the group. A purge flow control valve 298 may be operably disposed in fluid communication between the first and second fuel circuit branches 280 and 282.

Figure 14:
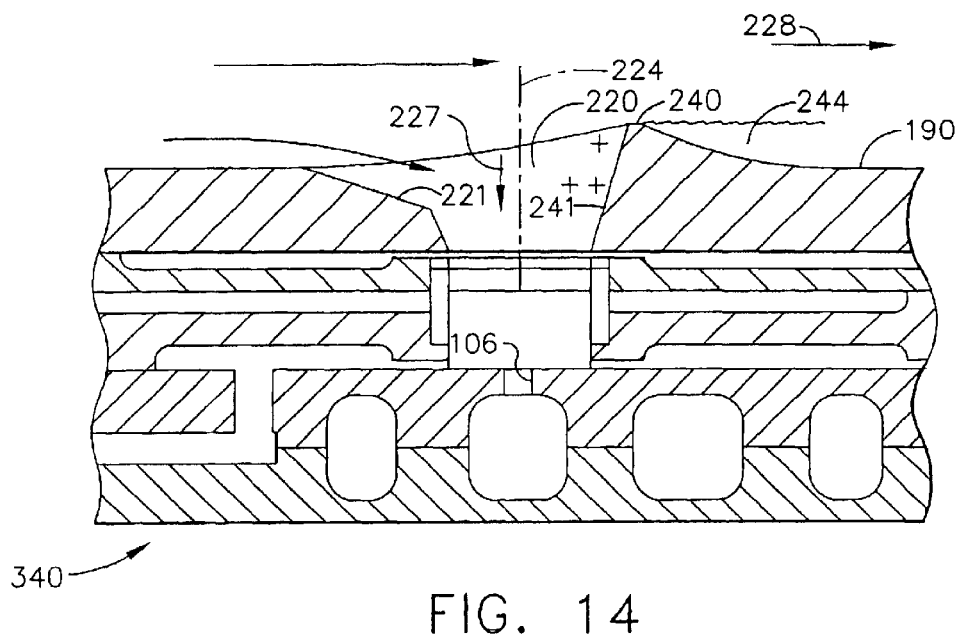
FIG. 14 is a cross-sectional view illustration of a relatively high static pressure spray well illustrated in FIG. 13.
Figure 15:
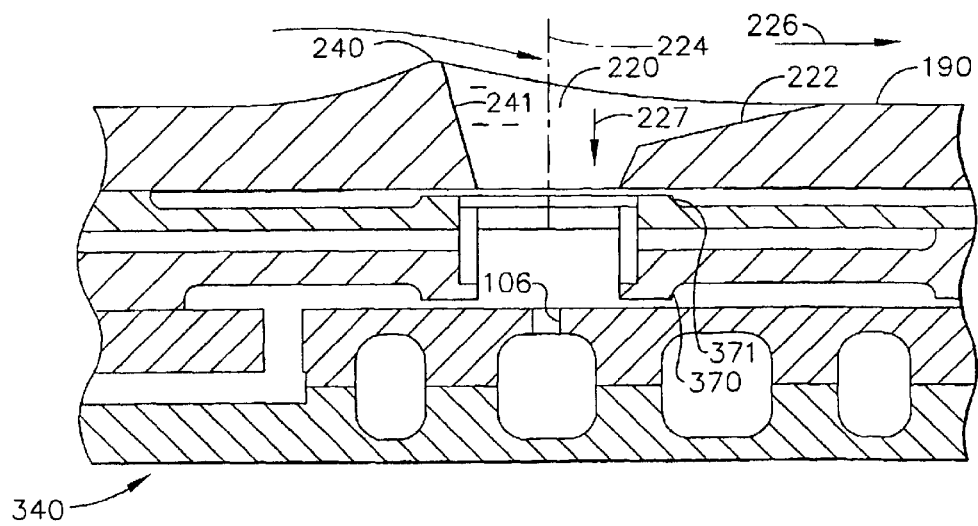
FIG. 15 is a cross-sectional view illustration of a relatively low static pressure spray well illustrated in FIG. 13.

The housing 190 has a purge means 216 for purging the main nozzle fuel circuit 102 of fuel while the pilot nozzle fuel circuit 288 supplies fuel to the pilot fuel nozzle 58. The purge means 216 is generally illustrated in FIGS. 3, 14, and 15 by a first exemplary differential pressure means 223 for generating sufficient static pressure differentials between at least two of the spray wells 220 to purge the main nozzle fuel circuit 102 (illustrated in FIG. 11) with purge air 227. The differential pressure means 223 includes relatively high and low static pressure spray wells, indicated by + and − signs, respectively, that have relatively high and low static pressure during purging. The high and low static pressure spray wells are also purge air inflow wells + and outflow wells − as the purge air enters the inflow wells + and discharges from the outflow wells −. The static pressure differential is provided by the shape of the spray wells 220 extending radially through the nozzle housing 190.

Figure 13:
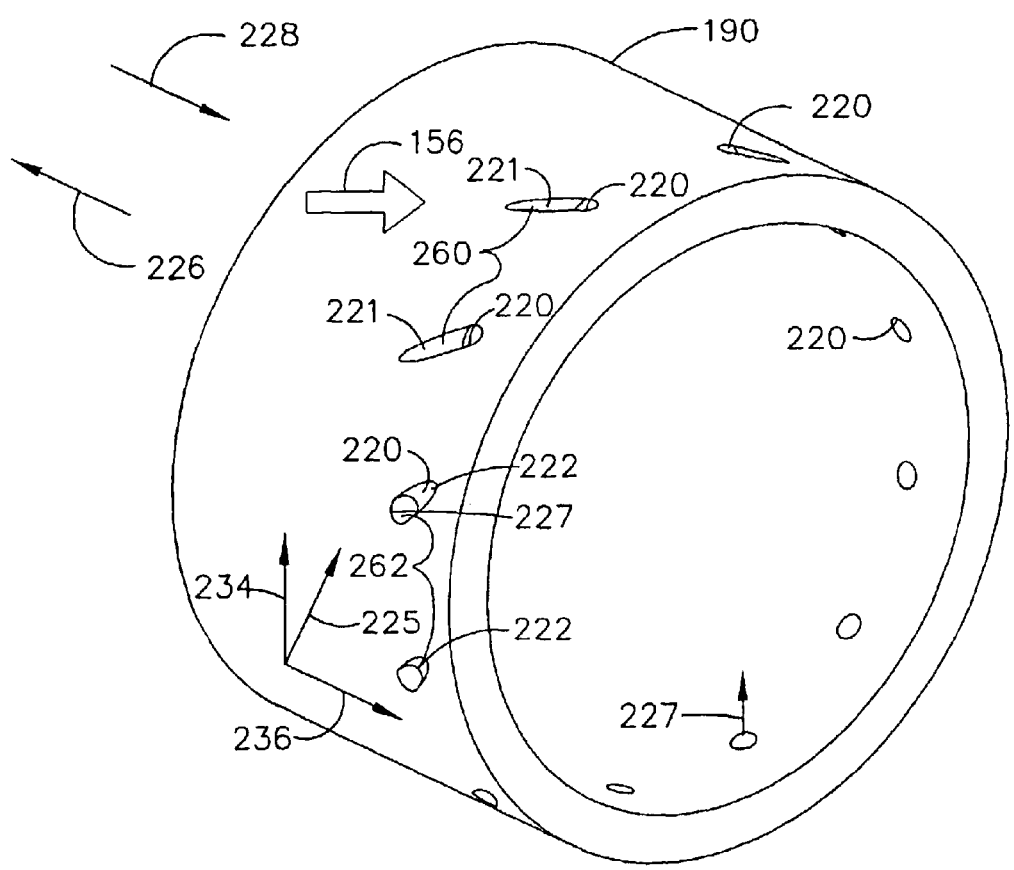
FIG. 13 is a perspective view illustration of a portion of the housing illustrated in FIG. 3 with asymmetrically flared out differential static pressure spray wells.

The spray wells 220 in FIG. 3 have asymmetrically upstream and downstream flared out well portions 221 and 222 that are asymmetrically flared out from symmetric well portions 241 of the spray wells 220 with respect to a spray well centerline 224 in local upstream and downstream directions 226 and 228 as more particularly illustrated in FIGS. 13, 14, and 15. The local streamwise direction 225, local upstream or downstream directions 226 and 228, has an axial component 236 parallel to a nozzle axis 52 about which the annular nozzle housing 190 is circumscribed and a circumferential component 234 around the nozzle housing 190 due to the swirled main mixer airflow 156. The asymmetrically flared out spray well 220 may also have a lip 240 around the symmetric well portion 241 of the spray well to enhance the local air pressure recovery or reduce the local static pressure for the asymmetrically upstream and downstream flared out well portions, respectively. The lip increases the size of a separation zone 244 extending downstream of the lip 240. The lip 240 may not be an attractive feature because it may produce auto-ignition of the fuel and air mixture that can burn the nozzle.

Figure 19:
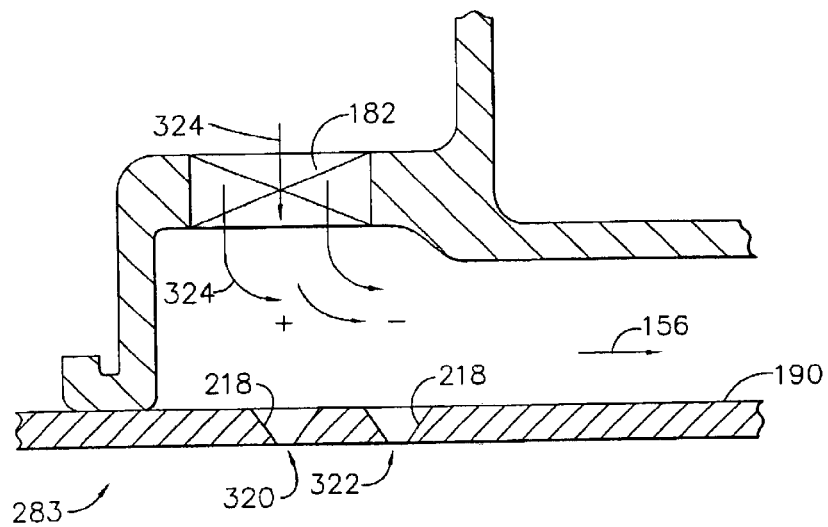
FIG. 19 is a cross-sectional view illustration of a housing with two rows of symmetrical cross-section spray wells with differential static pressure causing mixer flow turning.
Figure 20:
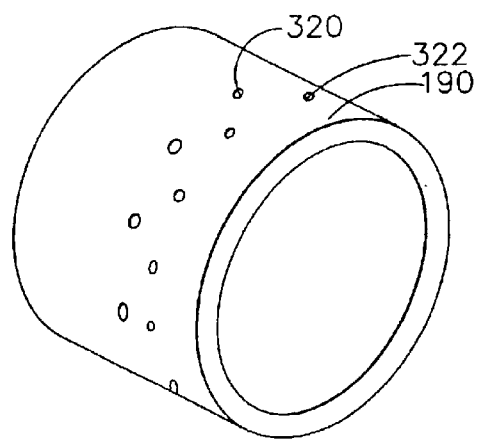
FIG. 20 is a perspective view illustration of a portion of the housing illustrated in FIG. 19.

A combination of the spray wells 220 having different shapes which includes the upstream asymmetrically flared out well portions 221 and/or downstream asymmetrically flared out well portions 222 and symmetrically flared out wells 218 (illustrated in FIG. 19). The symmetrically flared out wells 218 may used with air inflow wells + or outflow wells − depending whether they are being used to induce the purge air to flow into the wells or discharges from the wells, respectively. The asymmetrically upstream and downstream flared out well portions produce positive and negative static pressure changes respectively, indicated by + and − signs in FIGS. 14 and 15, in the swirled main mixer airflow 156 along the nozzle housing 190. The symmetrically flared out wells 218 produce substantially no static pressure rises in the swirled main mixer airflow 156 at the spray wells 220 having the symmetrically flared out well portions. A combination of any two of the three types of flared out well portions produce a static pressure differential through at least a portion of the main nozzle fuel circuit 102 allowing fuel to be purged from the main nozzle fuel circuit 102.

One arrangement of the adjacent ones of the spray orifices 106 and of flared out well portions produce a static pressure differential between adjacent ones of the spray wells 220 aligned with the spray orifices 106 in the clockwise and counterclockwise extending annular legs 284 and 286. In the embodiment where the clockwise and counterclockwise extending annular legs 284 and 286 have parallel first and second waves 290 and 292, respectively, the spray orifices 106 are located in alternating ones of the first and second waves 290 and 292 and are circularly aligned along the circle 300. In this embodiment, the adjacent ones of the spray orifices 106 in the clockwise and counterclockwise extending annular legs 284 and 286 are aligned with every other one of the spray wells 220 along the circle 300 of the spray wells.

Thus, every other one of the spray wells 220 along the circle 300 is aligned with one of an adjacent pair of the spray orifices 106 in the clockwise and counterclockwise extending annular legs 284 and 286. Illustrated in FIG. 11 are adjacent orifice pairs 289 of the spray orifices 106 in the clockwise and counterclockwise extending annular legs 284 and 286. The spray orifices 106 in each of the adjacent orifice pairs 289 are aligned with spray wells 220 having different shapes (the upstream asymmetrically flared out well portions 221, downstream asymmetrically flared out well portions 222, and symmetrically flared out wells 218). This is further illustrated in FIG. 13 which shows alternating upstream spray well pairs 260 of the upstream asymmetrically flared out spray well portions 221 and downstream spray well pairs 262 of the downstream asymmetrically flared out spray well portions 222. The upstream asymmetrically flared out well portions 221 are used for purge air inflow wells + and the downstream asymmetrically flared out well portions 222 are used for outflow wells −.

Figure 16:
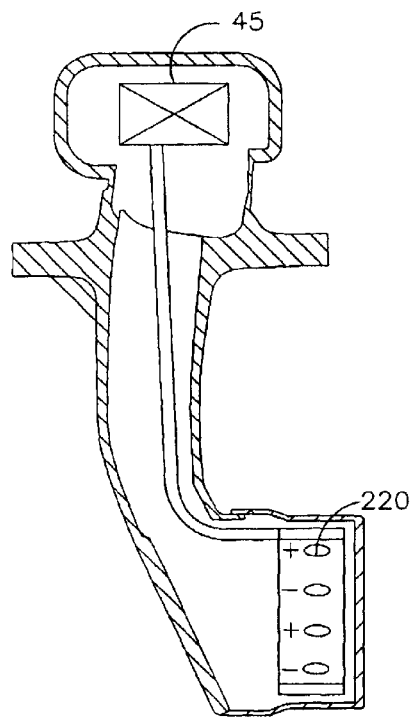
FIG. 16 is a schematic illustration of a fuel injector with relatively high and low static pressure spray wells.
Figure 17:
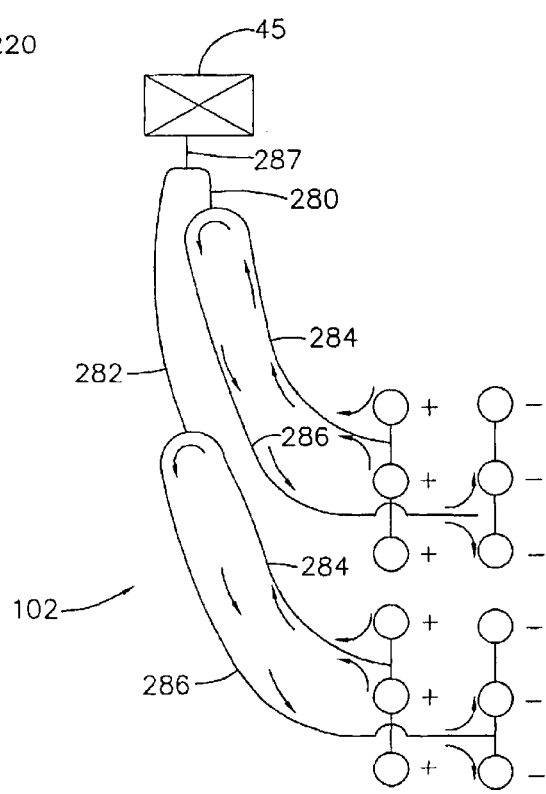
FIG. 17 is a schematic illustration of a fuel circuit for the fuel injector illustrated in FIG. 16.

An alternative arrangement of the spray wells 220 and the spray orifices 106 is illustrated in FIGS. 16 and 17. The spray wells 220 and the spray orifices 106 are disposed along the circle 300. All the spray orifices 106 in the clockwise extending annular legs 284 in the first and second fuel circuit branches 280 and 282 are aligned with purge air inflow wells + or spray wells 220 as illustrated in FIGS. 16 and 17. All the spray orifices 106 in the counterclockwise extending annular legs 286 in the first and second fuel circuit branches 280 and 282 are aligned with outflow wells − as illustrated in FIGS. 16 and 17. Thus, the fuel purges through the first and second fuel circuit branches 280 and 282 from the spray orifices 106 in the clockwise extending annular legs 284 to the counterclockwise extending annular legs 286 thus purging the main nozzle fuel circuit 102.

Figure 18:
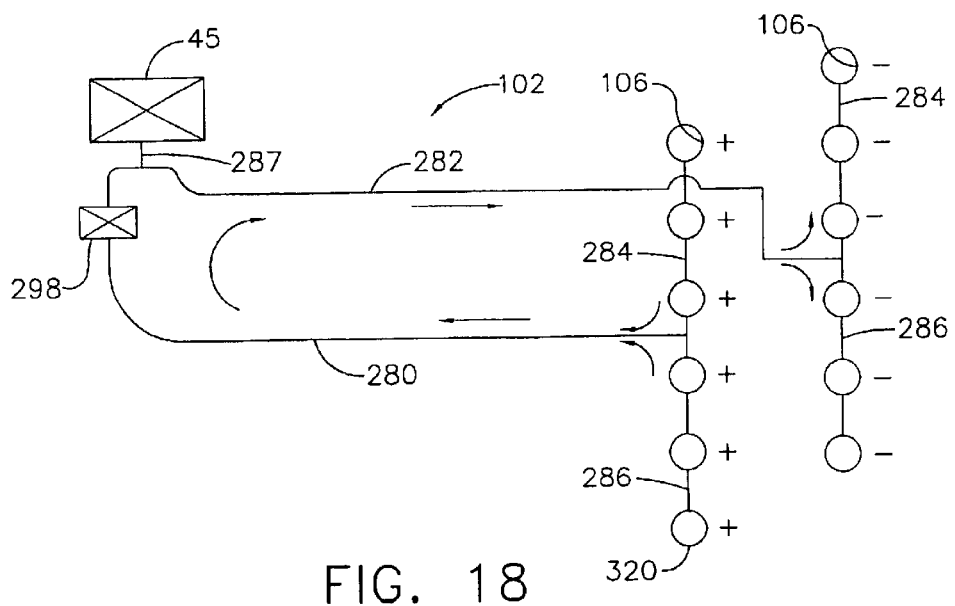
FIG. 18 is a schematic illustration of alternative fuel circuit for the fuel injector illustrated in FIG. 16.

Illustrated in FIGS. 18 and 19, is a second exemplary differential pressure means 283 for generating sufficient static pressure differentials between at least two of the spray wells 220 to purge the main nozzle fuel circuit 102. The spray orifices 106 and respective spray wells 220 with symmetrically flared out wells 218 are arranged in upstream and downstream annular rows 320 and 322. The upstream annular row 320 of the spray wells 220 is generally radially aligned with the main radial inflow swirlers 182. A part of the main mixer airflow 156 is a swirled radial inflow 324 from the main radial inflow swirlers 182 which is turned along the nozzle housing 190 near the spray wells 220 in the upstream annular row 320. This produces a relatively high static pressure, indicated by the + sign, in the main mixer airflow 156 near the spray wells 220, which are inflow wells +, in the upstream annular row 320 and a relatively low static pressure, indicated by the − sign, in the main mixer airflow 156 near the spray wells 220, which are outflow wells −, in the downstream annular row 322. Thus, the fuel purges through the first and second fuel circuit branches 280 and 282 from the spray orifices 106 aligned with the respective spray wells 220 in the upstream annular rows 320 to the spray orifices 106 aligned with the respective spray wells 220 in the downstream annular row 322.

A single fuel valve 45 is illustrated in FIG. 17 to control fuel flow through the first and second fuel circuit branches 280 and 282 of the main nozzle fuel circuit 102. However, the main nozzle fuel circuit 102 may eliminate the trunk line 287 and incorporate two fuel valves 45, each of the fuel valves 45 feeding one of the first and second fuel circuit branches 280 and 282. This would allow staging of the branches such that one branch and its fuel orifices may be shut down while the other branch is flowing fuel.

Figure 4:
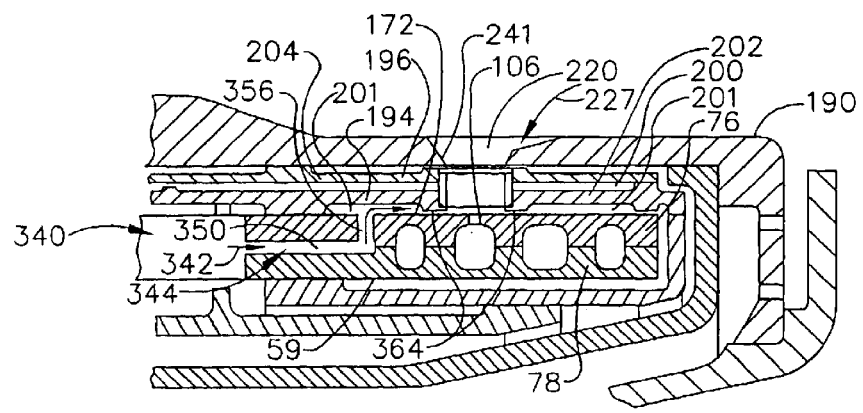
FIG. 4 is an enlarged cross-sectional view illustration of a portion of a first alternative fuel nozzle assembly with cooled purge air.
Figure 6:
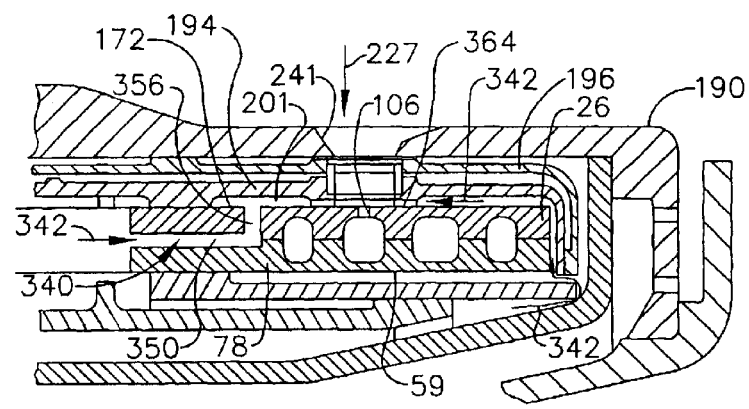
FIG. 6 is an enlarged cross-sectional view illustration of a purge air cooling path in the second alternative fuel nozzle assembly illustrated in FIG. 5.
Figure 7:
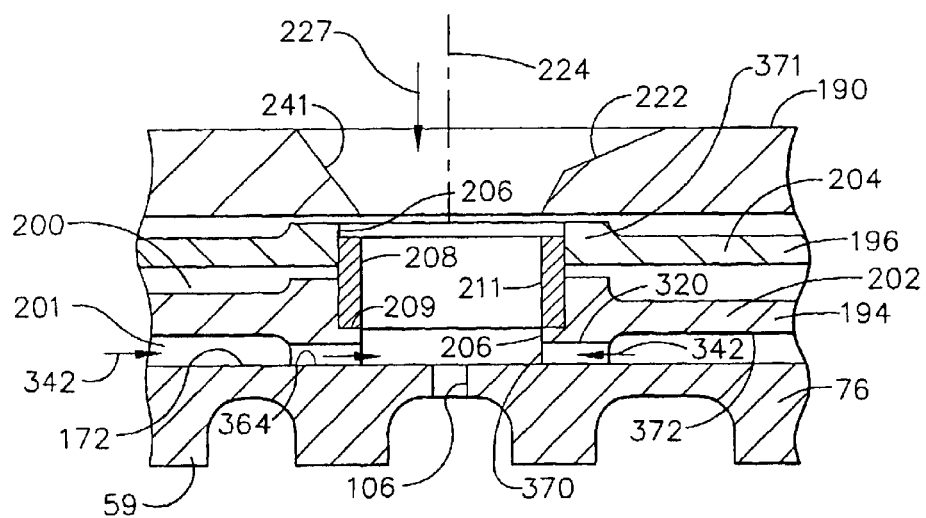
FIG. 7 is an enlarged cross-sectional view illustration of a spray well and portions of the purge air cooling path through a heat shield surrounding a main nozzle illustrated in FIGS. 4, 5, and 6.

The differential pressure means disclosed herein allow the fuel to quickly and fully purge from the main nozzle fuel circuits 102 in the main fuel nozzles 59 while the engine operates and fuel continues to flow to the pilot fuel nozzle 58. There may be engine and nozzle designs where it is desirable to cool the air that purges the main nozzle fuel circuits 102. Illustrated in FIGS. 4, 6, 7, and 8 is a first purge air cooling means 340 for supplying a cooled portion 342 of the purge air 227 to those spray wells 220 that are effective for increasing the local static pressure at the spray wells during purge. A purge air cooling path 344 runs through or along the main fuel nozzle 59 to cool purge air with the pilot fuel flow in the clockwise and counterclockwise extending annular pilot legs 294 and 296 (only the counterclockwise extending annular pilot legs 296 are illustrated in FIGS. 4, 6, and 7) of the pilot fuel circuit 288.

The purge air cooling path 344 is in thermal conductive communication with the annular pilot legs and cooled by the fuel carried therethrough during purging. The cooled portion 342 of the purge air 227 is pressure induced to flow from compressor discharge air outside the main fuel nozzle 59, through the purge air cooling path 344, and to the spray wells 220 that are at a lower pressure than the compressor discharge air. The laminated main fuel nozzle 59 is cooled by the fuel flowing in the pilot fuel circuit 288 and the closer the air cooling path 344 is to the pilot fuel circuit 288 the cooler the cooled portion 342 of the purge air 227 will be when it enters the spray wells 220. The purge air cooling path 344 illustrated in FIG. 4 includes axially extending passages 350 through the main fuel nozzle 59 and may be formed by etching grooves in the first and second plates 76 and 78 of the main fuel nozzle 59. The purge air cooling path 344 further includes radially extending passages 356 in serial flow relationship with axially extending passages 350 and extending through the radially outer first plate 76. The cooled portion 342 of the purge air 227 flows from the purge air cooling path 344 into an annular outer gap 201 between the inner heat shield 194 and the main fuel nozzle 59. The cooled portion 342 then flows through axially extending apertures 364 through the inner boss 370 that located on a radially outer surface 372 of the inner heat shield 194 and that have openings 206 aligned with the spray wells 220 that produce a relative high static pressure, indicated by the + sign, the inflow wells +. The axially extending apertures 364 may include slots 367 and/or holes 369. The axially extending apertures 364 through bosses 370 allow the cooled portion 342 of the purge air 227 to be induced to flow into the openings 206 and radially inwardly into the spray orifices 106.

Figure 21:
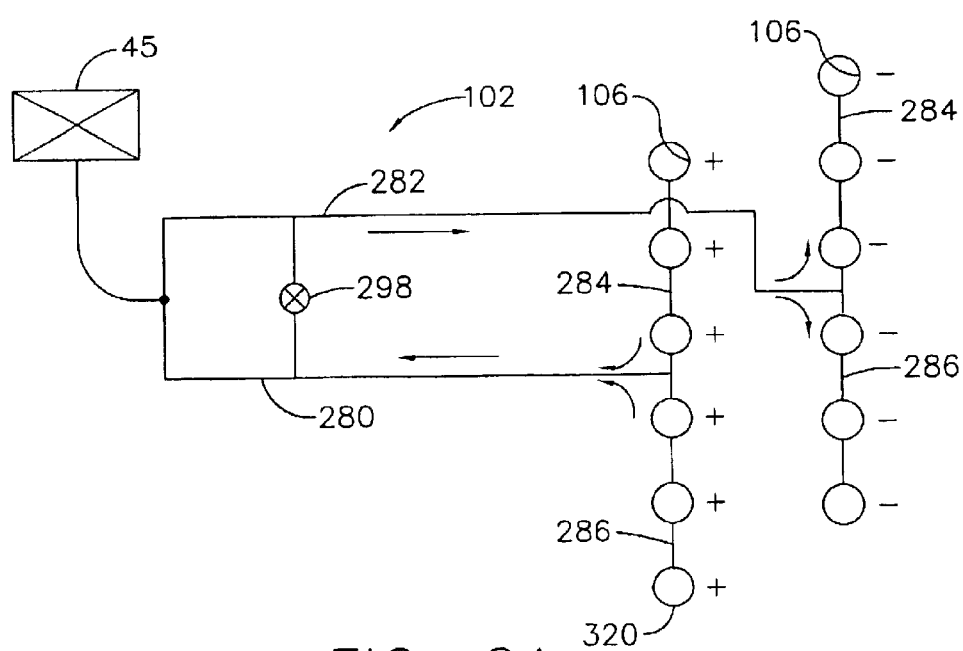
FIG. 21 is a schematic illustration of a purge flow control valve between branches of a fuel circuit for the fuel injector.

Illustrated in FIG. 21 is an alternative design in which the fuel flow to the first and second fuel circuit branches 280 and 282 are individually controlled by one the fuel valves 45. When fuel is shutoff to the first and second fuel circuit branches 280 and 282 purge air cannot flow between the branches. A purge flow control valve 298 is operably located between the branches and is normally closed when fuel is flowing to through the branches. The purge flow control valve 298 is used to provide low level and high level purging to prevent overheating of the main fuel nozzle during purging.

Low level purging occurs when fuel flow is shut off by one of the fuel valves 45 and the purge flow control valve 298 is closed. Small relative pressure differences between the outflow wells − drives relatively low rate purge airflow through the circuit within the annular main fuel nozzle feeding the orifices at the outflow wells −. Small relative pressure differences between the inflow wells + drives relatively low rate purge airflow through the circuit within the annular main fuel nozzle feeding the orifices at the inflow wells +. High level purging occurs when the purge flow control valve 298 is opened. This allows purge air to flow from the first fuel circuit branch 280 to the second fuel circuit branch 282 because of the relatively high pressure differential between average pressure of the inflow wells + at the orifices of the first fuel circuit branch 280 and the average pressure of the outflow wells − at the orifices of the second fuel circuit branch 282. When purging is sufficiently complete, the purge flow control valve 298 is closed returning the purging process to low level purging. This would allow the use of alternate high and low purge air flow bursts commanded by the engine control to improve purge effectiveness while preventing injector from overheating.

The maximum allowable high purge dwell time is generally a function of P3, T3, and Wf and would be scheduled accordingly. P3 and T3 are turbine pressure and temperature and Wf is fuel flow rate. The purge flow control valve 298 may also be used between the first and second fuel circuit branches 280 and 282 illustrated in FIG. 18. In this arrangement, the purge control valve 298 is open during fuel flow, open during high level purging, and closed during low level purging.

Figure 23:
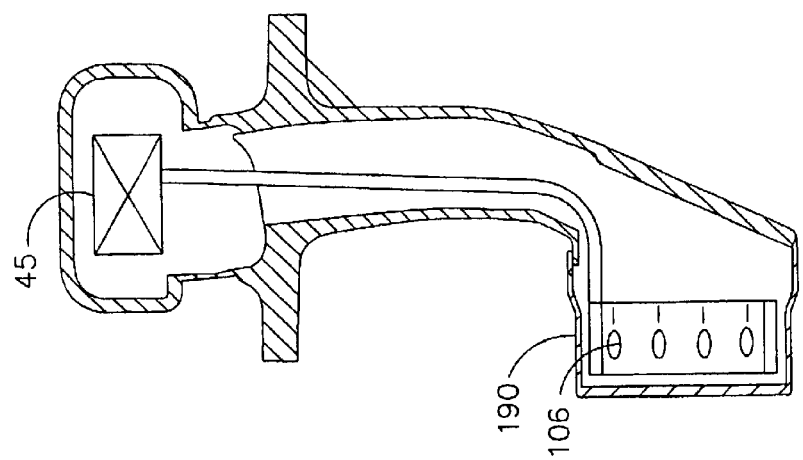
FIG. 23 is a cross-sectional view illustration of a second side of the housing in FIG. 22 with a semi-circular row of orifices aligned with relatively low static pressure spray wells.
Figure 22:
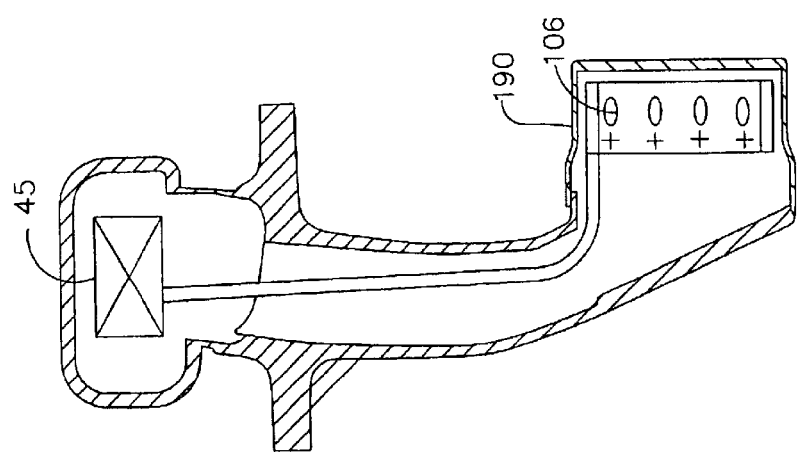
FIG. 22 is a cross-sectional view illustration of one side of a housing with a semi-circular row of orifices aligned with relatively high static pressure spray wells.
Figure 24:
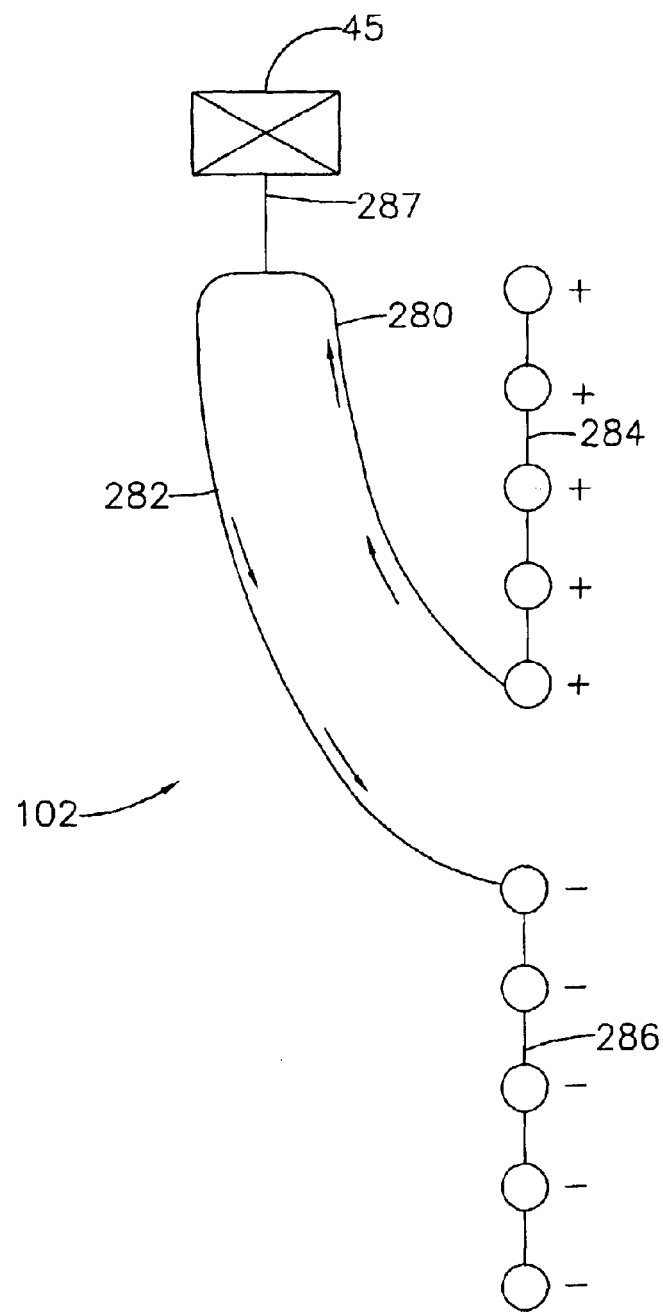
FIG. 24 is a schematic illustration of a fuel circuit for the fuel injector and housing illustrated in FIGS. 22 and 23.

Another alternative arrangement of the spray wells 220 and the spray orifices 106 is illustrated in FIGS. 22 and 23. The spray wells 220 and the spray orifices 106 are disposed along a circle. Illustrated in FIG. 22 is a semi-circular row of the spray orifices 106 aligned with relatively high static pressure spray wells denoted by the + signs. Illustrated in FIG. 23 is another semi-circular row of the spray orifices 106 aligned with relatively low static pressure spray wells denoted by the − signs. FIG. 24 illustrates the first and second fuel circuit branches 280 and 282 feeding the orifices 106 aligned with the purge air inflow wells + and outflow wells.

Illustrated in FIG. 5 is a second purge air cooling means 380 for supplying the cooled portion 342 of the purge air 227. The purge air cooling path 344 runs through an innermost annular gap 386 between the main fuel nozzle 59 and an innermost annular heat shield 384 to cool purge air with the pilot fuel flow in the pilot fuel circuit 288. The cooled portion 342 of the purge air 227 may flow through cooling holes 382 in the innermost annular heat shield 384 and/or through a slip fit connection 388 between the innermost annular heat shield 384 and ends of the radially inner and outer heat shields 194 and 196. The cooling holes 382 and the slip fit connection 388 allows the air cooling path 344 to run around the main fuel nozzle 59 instead of through it and still be in thermal conductive communication with the annular pilot legs and cooled by the fuel carried therethrough during purging.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A fuel injector comprising:
   an annular nozzle housing circumscribed about a nozzle axis,
   an annular fuel nozzle circumscribed about the nozzle axis within the housing,
   the annular fuel nozzle including at least one main nozzle fuel circuit and a pilot nozzle fuel circuit,
   spray orifices extending radially away from main nozzle fuel circuit through the annular fuel nozzle,
   spray wells extending radially through the nozzle housing and aligned with the spray orifices, and
   an asymmetric cyclone means for generating a swirling flow around the nozzle and an asymmetric static pressure differential around the housing wherein the asymmetric cyclone means is located radially outwardly of the housing.

2. The fuel injector as claimed in claim 1, wherein the asymmetric cyclone means is a symmetrical radial inflow swirler circumscribed about a cyclone axis that is not collinear with the nozzle axis.

3. The fuel injector as claimed in claim 2, wherein the cyclone axis is spaced apart from and parallel to the nozzle axis.

4. The fuel injector as claimed in claim 2, wherein the cyclone axis is skewed from the nozzle axis.

5. The fuel injector as claimed in claim 1, wherein the asymmetric cyclone means is a plurality of angled flow swirling elements angled with respect to and asymmetrically circumscribed about a cyclone axis.

6. The fuel injector as claimed in claim 5 further comprising the cyclone axis being collinear with the nozzle axis.

7. The fuel injector as claimed in claim 6 further comprising the angled flow swirling elements being swirl vanes asymmetrically spaced about the cyclone axis.

8. The fuel injector as claimed in claim 6 further comprising the angled flow swirling elements being swirl vanes having an asymmetrical swirl angle variation about the cyclone axis.

9. The fuel injector as claimed in claim 6 further comprising the angled flow swirling elements being swirl vanes having an asymmetrical vane thickness variation about the cyclone axis.

10. The fuel injector as claimed in claim 6 further comprising the angled flow swirling elements being swirl slots asymmetrically spaced about the cyclone axis.

11. The fuel injector as claimed in claim 6 further comprising the angled flow swirling elements being swirl slots being asymmetrically angled with respect to the cyclone axis.

12. The fuel injector as claimed in claim 6 further comprising the angled flow swirling elements being swirl slots having an asymmetrical slot thickness variation about the cyclone axis.

13. The fuel injector as claimed in claim 1, further comprising:
the annular fuel nozzle formed from a single feed strip having a single bonded together pair of lengthwise extending plates,
each of the plates having a single row of widthwise spaced apart and lengthwise extending parallel grooves, and
the plates being bonded together such that opposing grooves in each of the plates are aligned forming the main nozzle fuel circuit and the pilot nozzle fuel circuit.

14. The fuel injector as claimed in claim 13, wherein the pilot nozzle fuel circuit further includes clockwise and counterclockwise extending annular legs having parallel first and second waves, respectively.

15. The fuel injector as claimed in claim 14, further comprising the spray orifices being located in alternating ones of the first and second waves so as to be substantially aligned along a circle.

16. The fuel injector as claimed in claim 1, further comprising the housing having a purge means for purging the main nozzle fuel circuit while the pilot nozzle fuel circuit supplies fuel to a pilot nozzle.

17. The fuel injector as claimed in claim 16, further comprising the spray wells having at least two types of the well portions chosen from a group consisting of symmetrically flared out well portions, asymmetrically upstream flared out well portions flared outwardly with respect to the spray well centerline in a local upstream direction, and asymmetrically downstream flared out well portions flared outwardly with respect to the spray well centerline in a local downstream direction.

18. The fuel injector as claimed in claim 17, further comprising adjacent ones of the spray orifices in each of the clockwise and the counterclockwise extending annular legs are aligned with spray wells having different types of the well portions chosen from the group.

19. The fuel injector as claimed in claim 18, further comprising a purge flow control valve operably disposed in fluid communication between the first and second fuel circuit branches.

20. The fuel injector as claimed in claim 16, wherein the housing includes a purge means for purging the main nozzle fuel circuit while the pilot nozzle fuel circuit supplies fuel to the pilot nozzle.

21. The fuel injector as claimed in claim 20, wherein the purge means is a differential pressure means for generating sufficient static pressure differentials between purge air inflow and outflow wells of the spray wells to purge the main nozzle fuel circuit while the pilot nozzle fuel circuit supplies fuel to the pilot nozzle.

22. The fuel injector as claimed in claim 21, wherein the purge air inflow and outflow wells include upstream flared out well portions asymmetrically flared out with respect to the spray well centerline in a local upstream direction and downstream flared out well portions asymmetrically flared out with respect to the spray well centerline in a local downstream direction respectively.

23. The fuel injector as claimed in claim 22, wherein the local streamwise direction has an axial component parallel to a nozzle axis about which the annular nozzle housing is circumscribed and a circumferential component around the nozzle housing.

24. The fuel injector as claimed in claim 22, wherein the asymmetric cyclone means is a symmetrical radial inflow swirler circumscribed about a cyclone axis that is not collinear with the nozzle axis.

25. The fuel injector as claimed in claim 24, wherein the cyclone axis is spaced apart from and parallel to the nozzle axis.

26. The fuel injector as claimed in claim 24, wherein the cyclone axis is skewed from the nozzle axis.

27. The fuel injector as claimed in claim 23, wherein the asymmetric cyclone means is a plurality of angled flow swirling elements angled with respect to and asymmetrically circumscribed about a cyclone axis.

28. The fuel injector as claimed in claim 27 further comprising the cyclone axis being collinear with the nozzle axis.

29. The fuel injector as claimed in claim 28 further comprising the angled flow swirling elements being swirl vanes asymmetrically spaced about the cyclone axis.

30. The fuel injector as claimed in claim 28 further comprising the angled flow swirling elements being swirl vanes having an asymmetrical swirl angle variation about the cyclone axis.

31. The fuel injector as claimed in claim 28 further comprising the angled flow swirling elements being swirl vanes having an asymmetrical vane thickness variation about the cyclone axis.

32. The fuel injector as claimed in claim 28 further comprising the angled flow swirling elements being swirl slots asymmetrically spaced about the cyclone axis.

33. The fuel injector as claimed in claim 28 further comprising the angled flow swirling elements being swirl slots being asymmetrically angled with respect to the cyclone axis.

34. The fuel injector as claimed in claim 28 further comprising the angled flow swirling elements being swirl slots having an asymmetrical slot thickness variation about the cyclone axis.

35. The fuel injector as claimed in claim 21 further comprising a purge air cooling means for supplying a cooled portion of purge air to the main nozzle fuel circuit during the purging wherein the cooled portion is cooled with fuel that flows through the pilot nozzle fuel circuit.

36. The fuel injector as claimed in claim 35, wherein the purge air inflow and outflow wells include upstream flared out well portions asymmetrically flared out with respect to the spray well centerline in a local upstream direction and downstream flared out well portions asymmetrically flared out with respect to the spray well centerline in a local downstream direction respectively.

37. The fuel injector as claimed in claim 36, wherein the local streamwise direction has an axial component parallel to a nozzle axis about which the annular nozzle housing is circumscribed and a circumferential component around the nozzle housing.

38. The fuel injector as claimed in claim 35, further comprising:
annular radially inner and outer heat shields radially located between the main nozzle and an outer annular nozzle wall of the nozzle housing,
the purge air cooling path in fluid flow communication with an annular outer gap between the inner heat shield and the main nozzle, bosses located on a radially inner surface of the inner heat shield and having openings aligned with the inflow wells, and axially extending apertures extending from the annular outer gap through the bosses to the openings.

39. The fuel injector as claimed in claim 38, wherein the purge air cooling means includes a purge air cooling path in thermal conductive communication with the pilot nozzle fuel circuit and operable to flow the cooled portion therethrough to the main nozzle fuel circuit during the purging.

40. The fuel injector as claimed in claim 39, wherein the purge air cooling path is in thermal conductive communication with at least one annular pilot leg of the pilot nozzle fuel circuit in the main nozzle.

41. The fuel injector as claimed in claim 40, wherein the air cooling path runs through the main nozzle.

42. The fuel injector as claimed in claim 40, wherein the air cooling path runs around the main nozzle.

43. The fuel injector as claimed in claim 40, wherein the purge air inflow and outflow wells include upstream flared out well portions asymmetrically flared out with respect to the spray well centerline in a local upstream direction and downstream flared out well portions asymmetrically flared out with respect to the spray well centerline in a local downstream direction respectively.

44. The fuel injector as claimed in claim 43, wherein the local streamwise direction has an axial component parallel to a nozzle axis about which the annular nozzle housing is circumscribed and a circumferential component around the nozzle housing.

45. The fuel injector as claimed in claim 21, further comprising:

the spray wells being symmetric spray wells, upstream and downstream annular rows of the symmetric spray wells, and the differential pressure means including an annular row of radial flow swirlers radially outwardly disposed around the upstream annular row of the spray wells.

46. The fuel injector as claimed in claim 45, wherein the local streamwise direction has an axial component parallel to a nozzle axis about which the annular nozzle housing is circumscribed and a circumferential component around the nozzle housing.

47. The fuel injector as claimed in claim 46 further comprising a purge air cooling means for supplying a cooled portion of purge air to the main nozzle fuel circuit during the purging wherein the cooled portion is cooled with fuel that flows through the pilot nozzle fuel circuit.

* * * * *

UNITED STATES PATENT AND TRADEMARK OFFICE
CERTIFICATE OF CORRECTION

PATENT NO. : 6,898,938 B2
DATED : May 31, 2005
INVENTOR(S) : Alfred Albert Mancini et al.

It is certified that error appears in the above-identified patent and that said Letters Patent is hereby corrected as shown below:

<u>Column 4,</u>
Line 46, "FIG." should read -- FIG. 1. --

Signed and Sealed this

Second Day of August, 2005

JON W. DUDAS
*Director of the United States Patent and Trademark Office*